United States Patent
Yokoyama et al.

(10) Patent No.: US 10,989,310 B2
(45) Date of Patent: Apr. 27, 2021

(54) INSERTION OF BUTTERFLY VALVE WITHOUT DISRUPTING FLOW

(71) Applicant: SUIKEN Co., Ltd., Shiga (JP)

(72) Inventors: Gunpei Yokoyama, Shiga (JP); Yasunari Sato, Shiga (JP)

(73) Assignee: SUIKEN CO., LTD., Shiga (JP)

( * ) Notice: Subject to any disclaimer, the term of this patent is extended or adjusted under 35 U.S.C. 154(b) by 59 days.

(21) Appl. No.: 16/486,509

(22) PCT Filed: Feb. 19, 2018

(86) PCT No.: PCT/JP2018/005689
§ 371 (c)(1),
(2) Date: Aug. 16, 2019

(87) PCT Pub. No.: WO2018/168339
PCT Pub. Date: Sep. 20, 2018

(65) Prior Publication Data
US 2020/0049259 A1   Feb. 13, 2020

(30) Foreign Application Priority Data

Mar. 14, 2017  (JP) .............................. JP2017-048963
Jun. 5, 2017  (JP) .............................. JP2017-110675

(51) Int. Cl.
*F16K 1/226*  (2006.01)
*F16K 27/02*  (2006.01)
(Continued)

(52) U.S. Cl.
CPC .......... *F16K 1/226* (2013.01); *F16K 27/0218* (2013.01); *F16K 3/22* (2013.01);
(Continued)

(58) Field of Classification Search
CPC ................ F16K 1/226; F16K 27/0218; Y10T 137/6048; F16L 55/105
See application file for complete search history.

(56) References Cited

U.S. PATENT DOCUMENTS 3,598,365 A * 8/1971 Werra .................... F16K 1/226
251/307

FOREIGN PATENT DOCUMENTS

EP          0640784 A1 * 3/1995  .......... F16K 49/002
JP        S60-143291 A     7/1985
(Continued)

OTHER PUBLICATIONS

International Search Report Issued in PCT/JP2018/005689 dated Apr. 17, 2018 (English Translation).

*Primary Examiner* — Kevin R Barss
(74) *Attorney, Agent, or Firm* — Renner, Otto, Boisselle & Sklar, LLP

(57) ABSTRACT

A process including: an assembly step of assembling a sealed case onto an existing pipe; a cutting step of forming a first opening of a groove shape elongated in a pipe axis direction of the existing pipe; a second boring step of forming a circular second opening at a position of the existing pipe that opposes the first opening; and an insertion step of inserting, in a valve-open state, a butterfly-shaped valve element that is integral with a valve rod, which runs through the first and second openings, into the existing pipe 1 through the first opening until a tip portion of the valve rod protrudes from the second opening.

15 Claims, 33 Drawing Sheets

(51) Int. Cl.
*F16K 3/22* (2006.01)
*F16K 41/08* (2006.01)
*F16L 41/06* (2006.01)
*F16L 55/00* (2006.01)

(52) U.S. Cl.
CPC ............... *F16K 41/08* (2013.01); *F16L 41/06* (2013.01); *F16L 55/00* (2013.01)

(56) References Cited

FOREIGN PATENT DOCUMENTS

| | | |
|---|---|---|
| JP | S62-46068 A | 2/1987 |
| JP | H5-40665 U | 6/1993 |
| JP | 2000-130682 A | 5/2000 |
| WO | WO-2018168339 A1 * | 9/2018 ......... F16K 27/0218 |

* cited by examiner

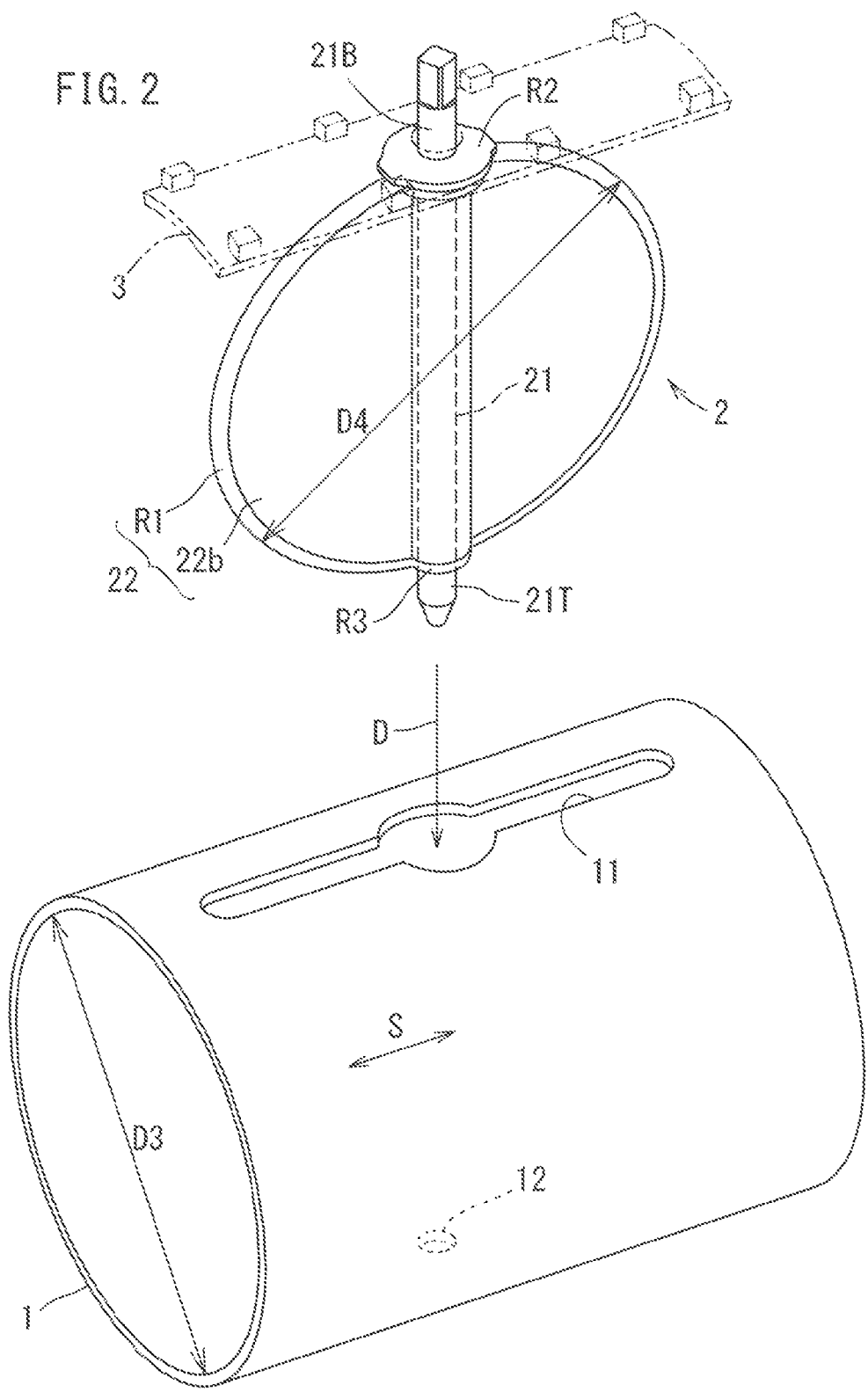

FIG.7
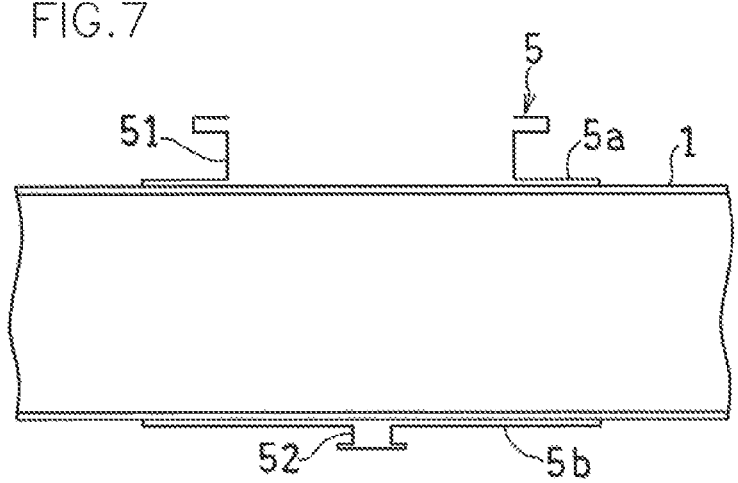
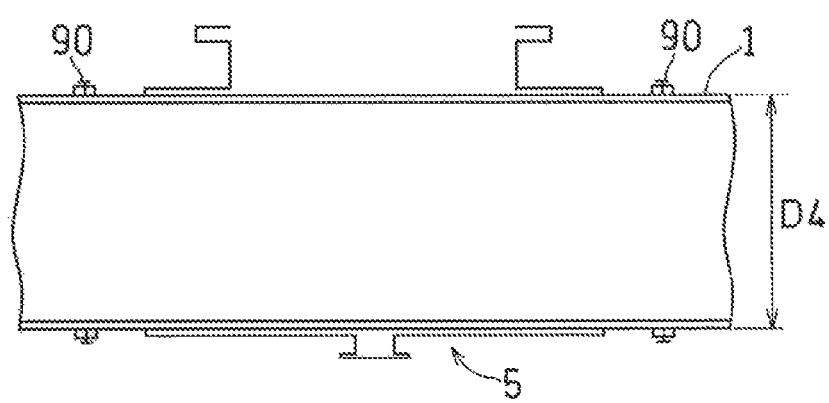
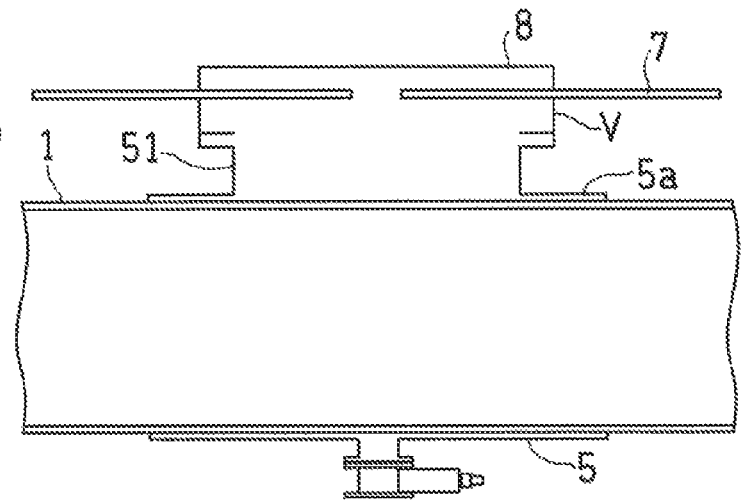

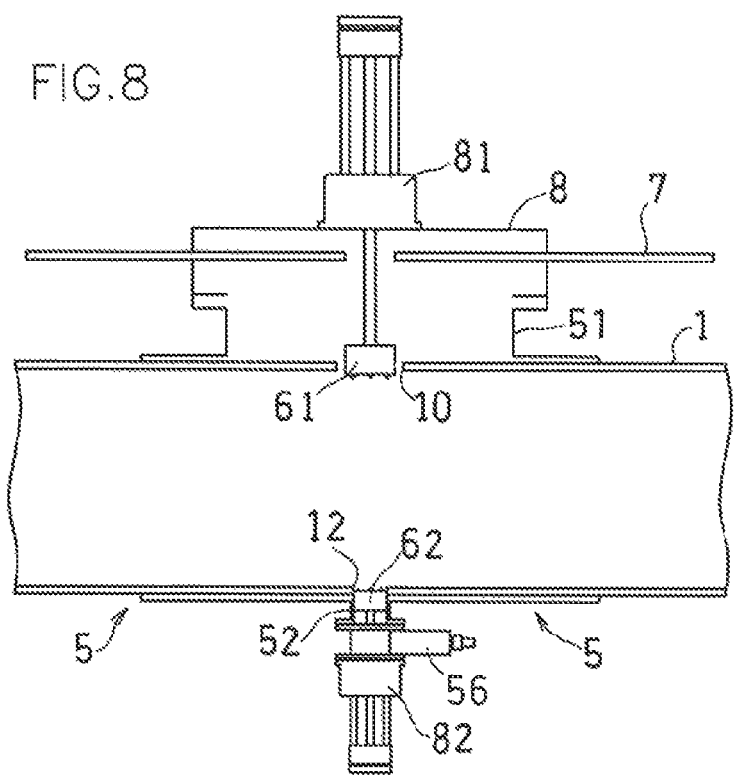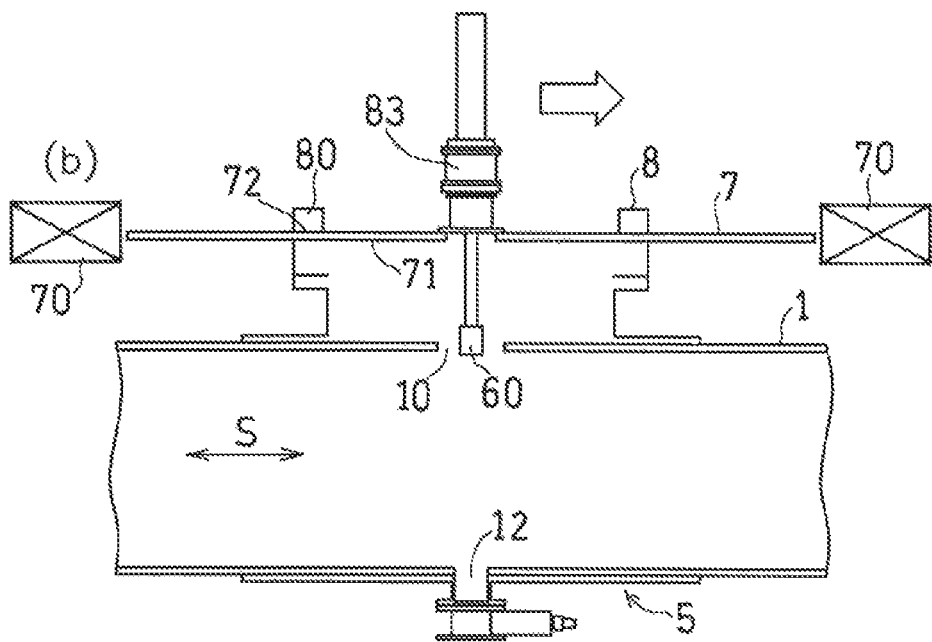

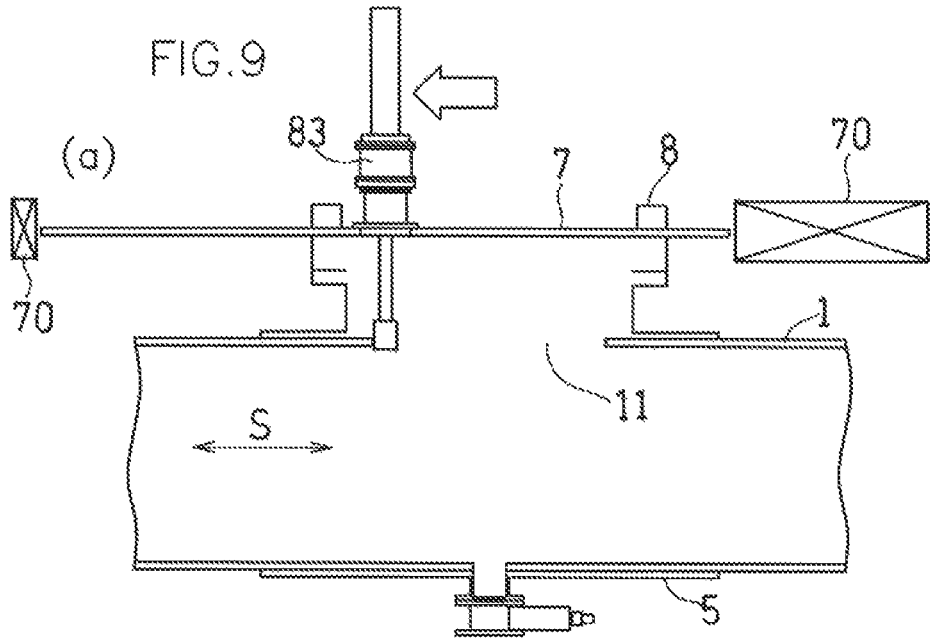
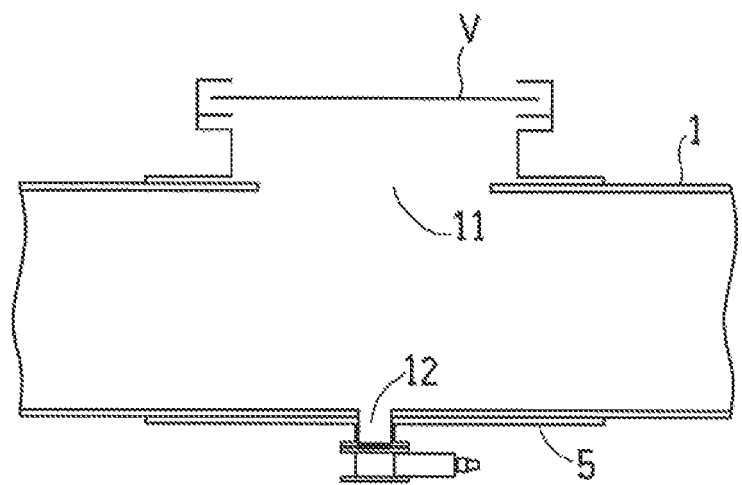

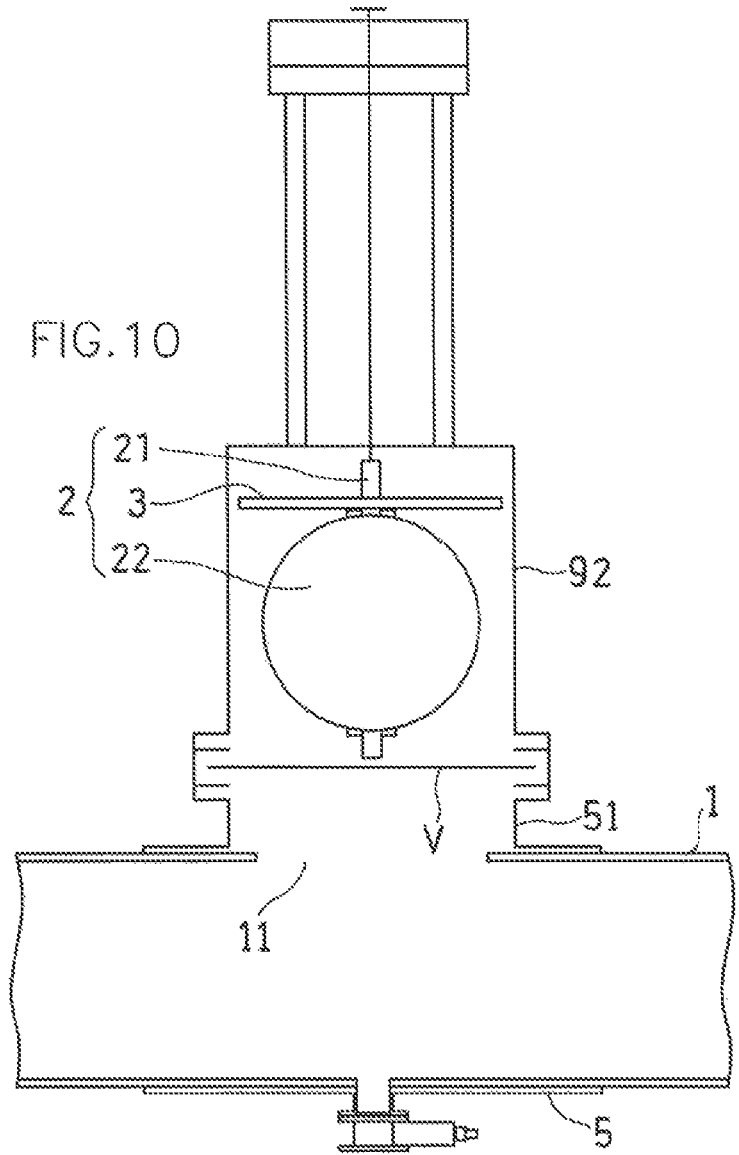

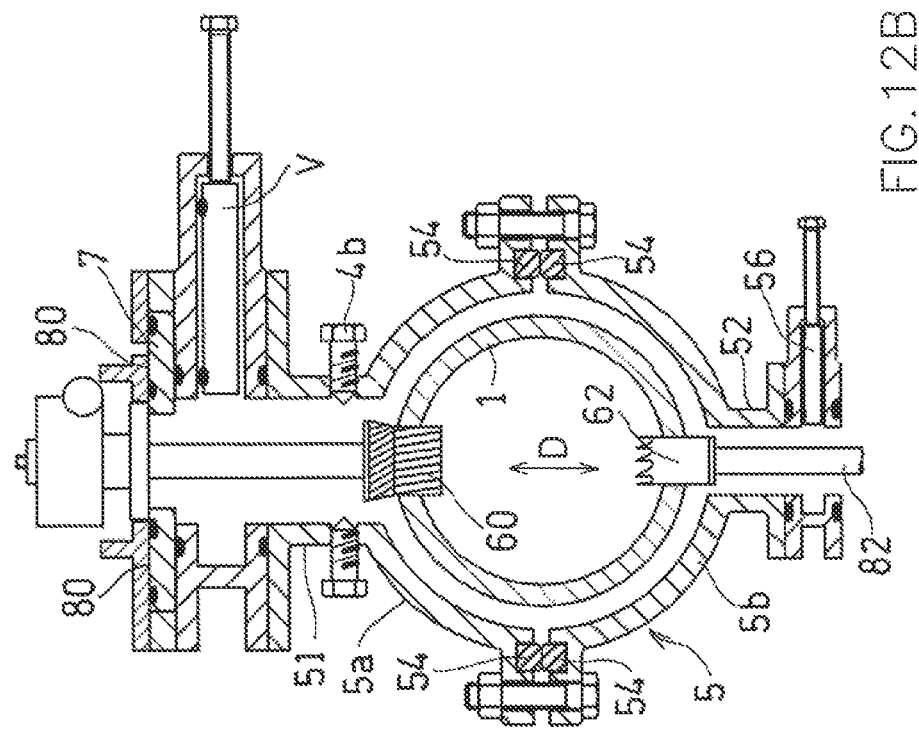
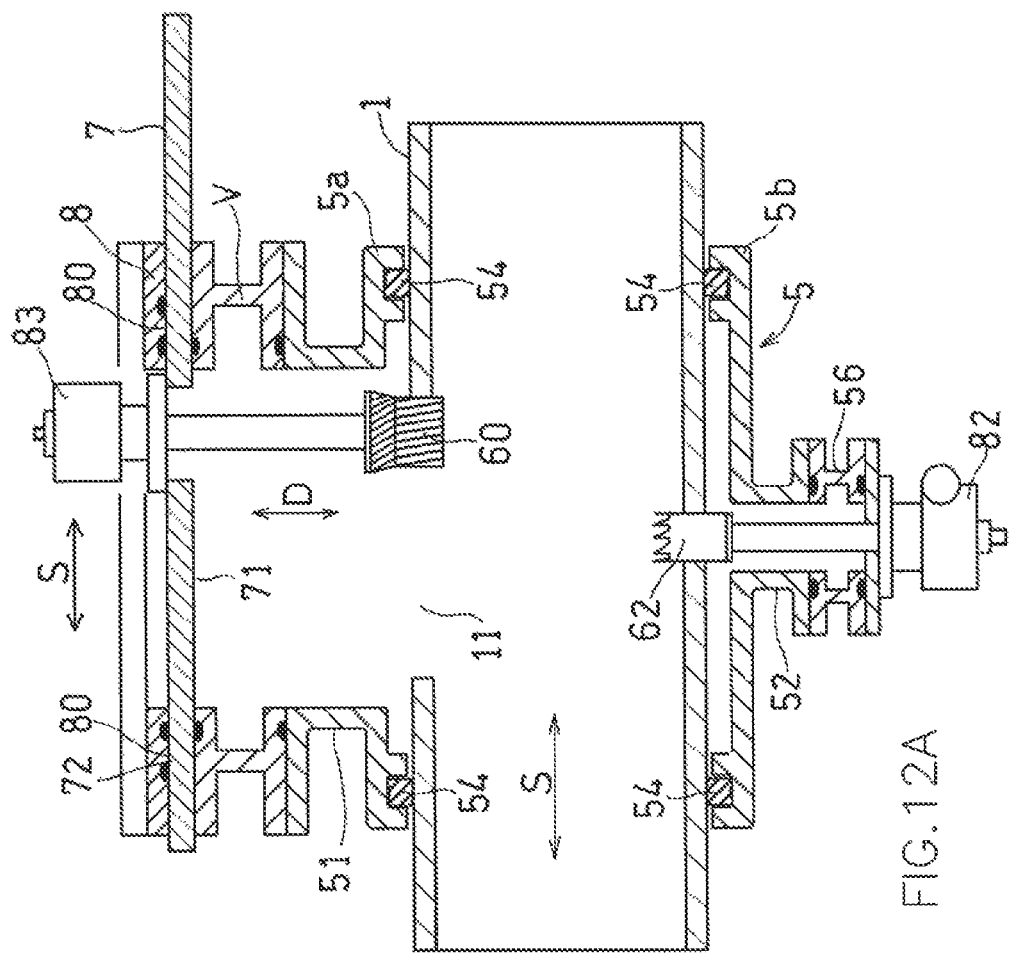

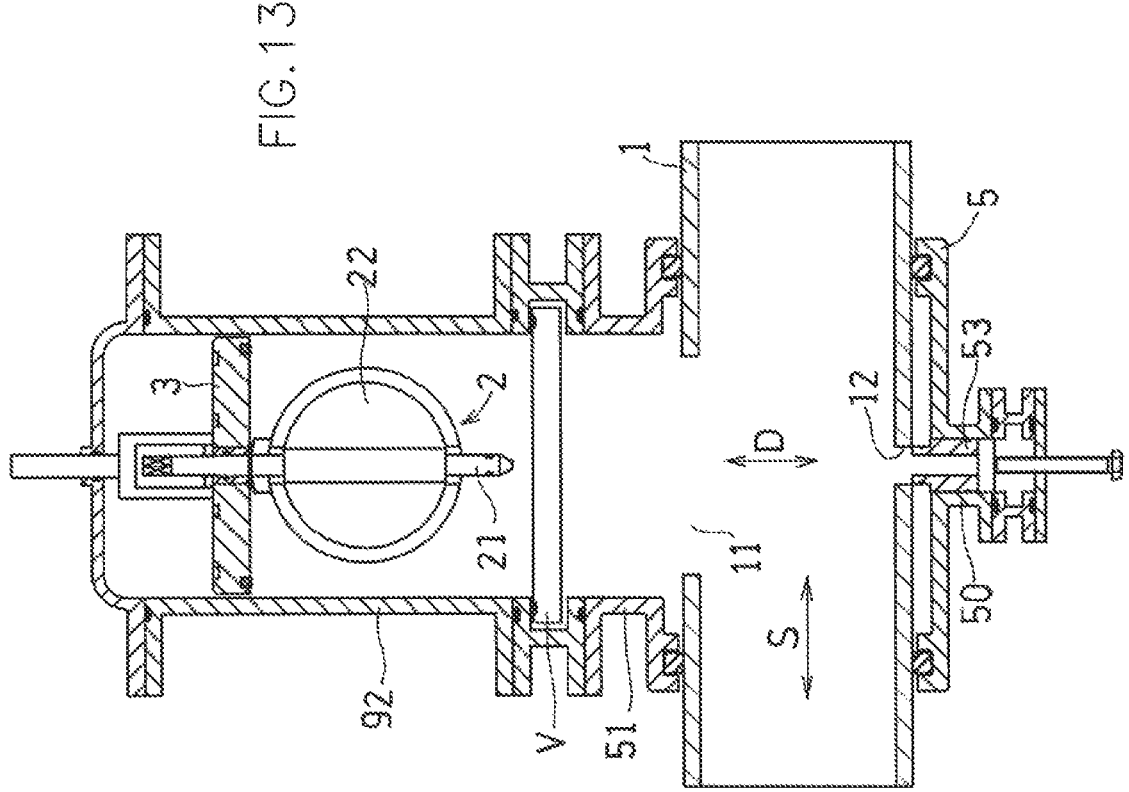

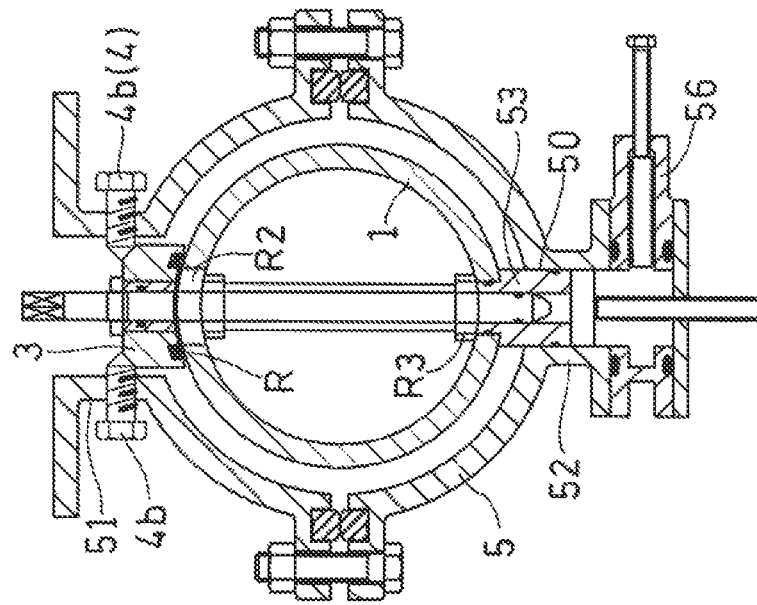
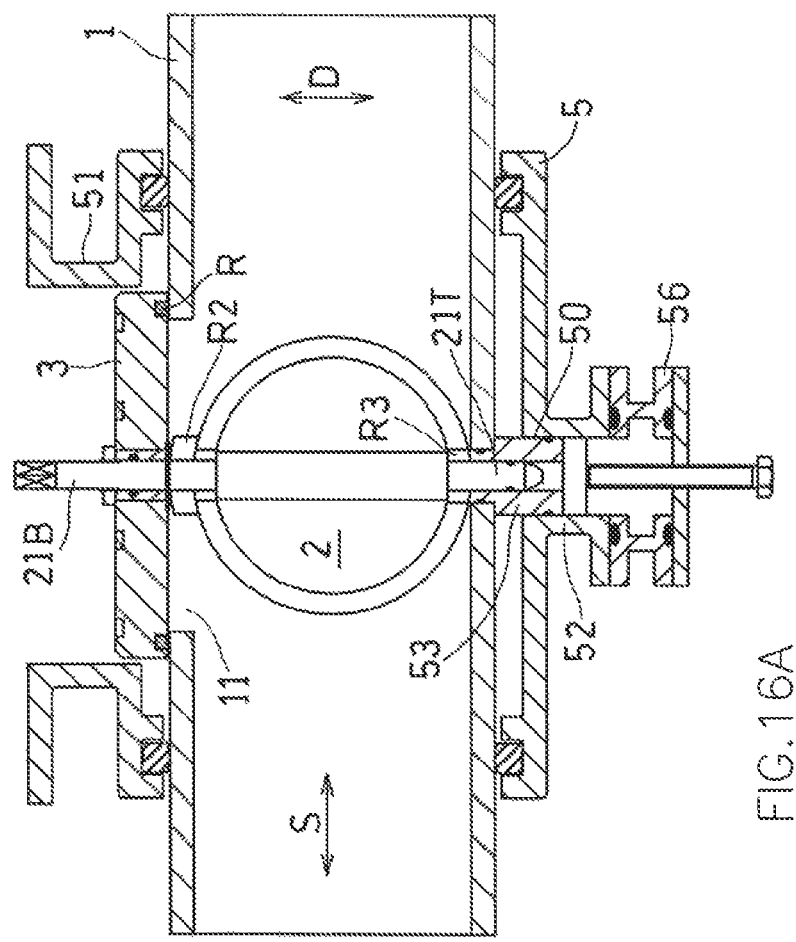
FIG.16B
FIG.16A

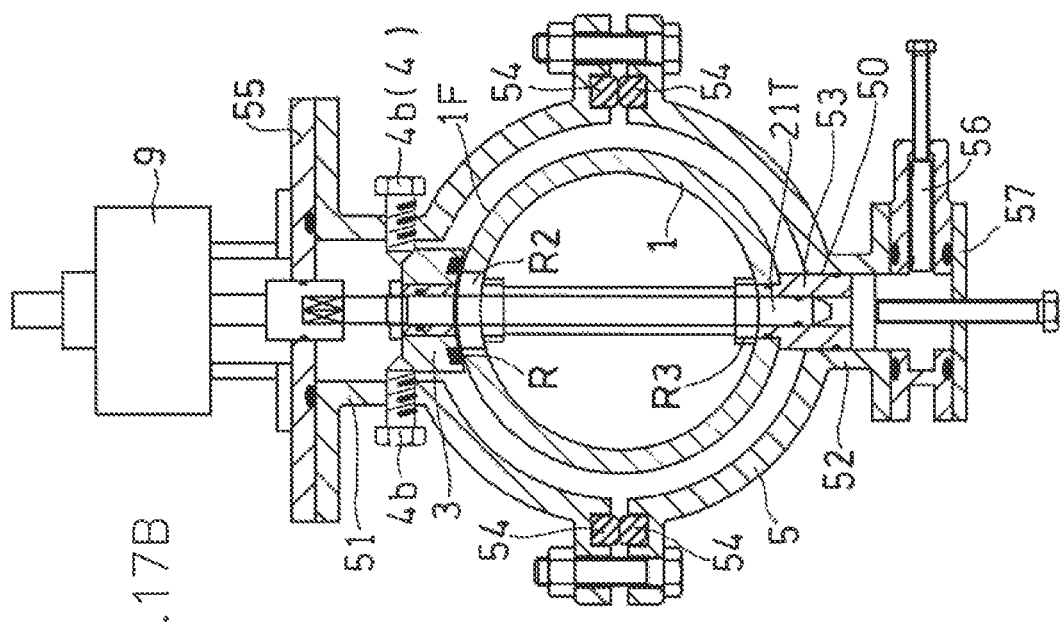
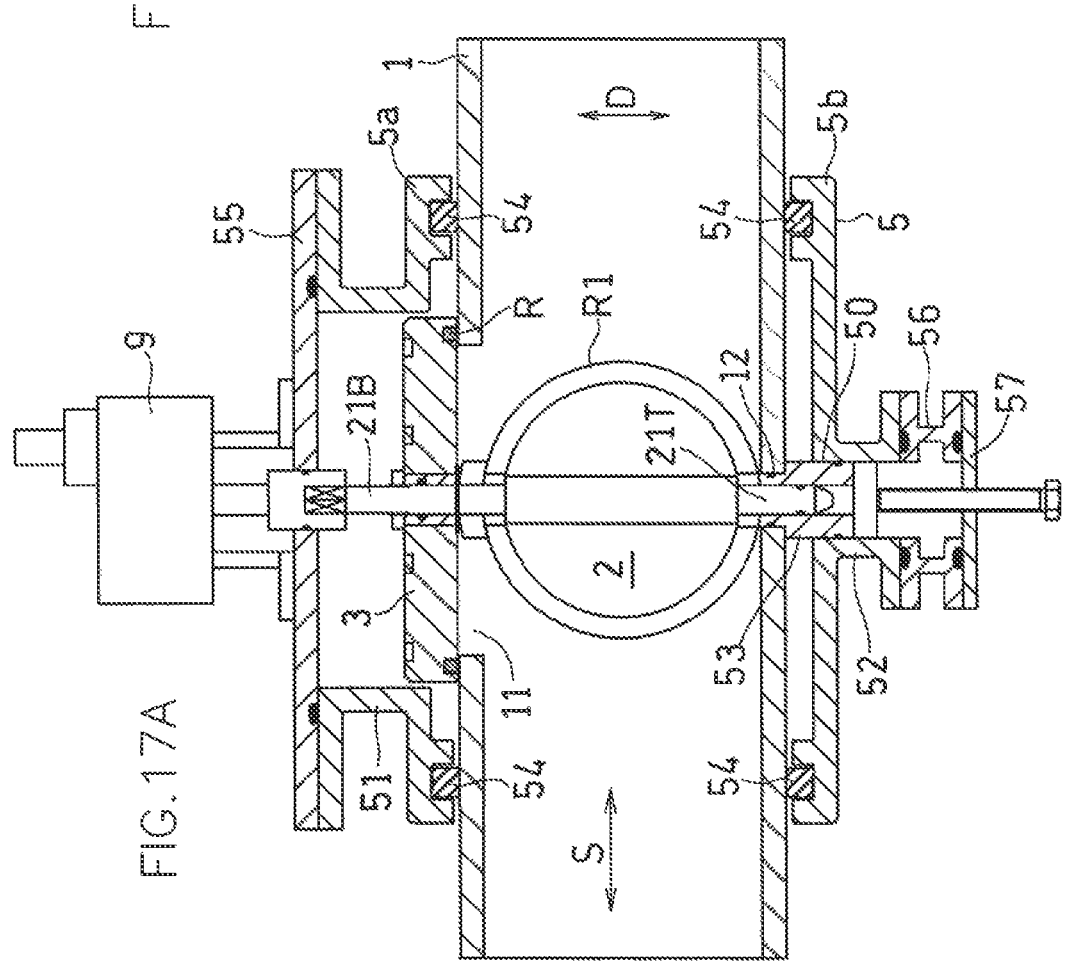

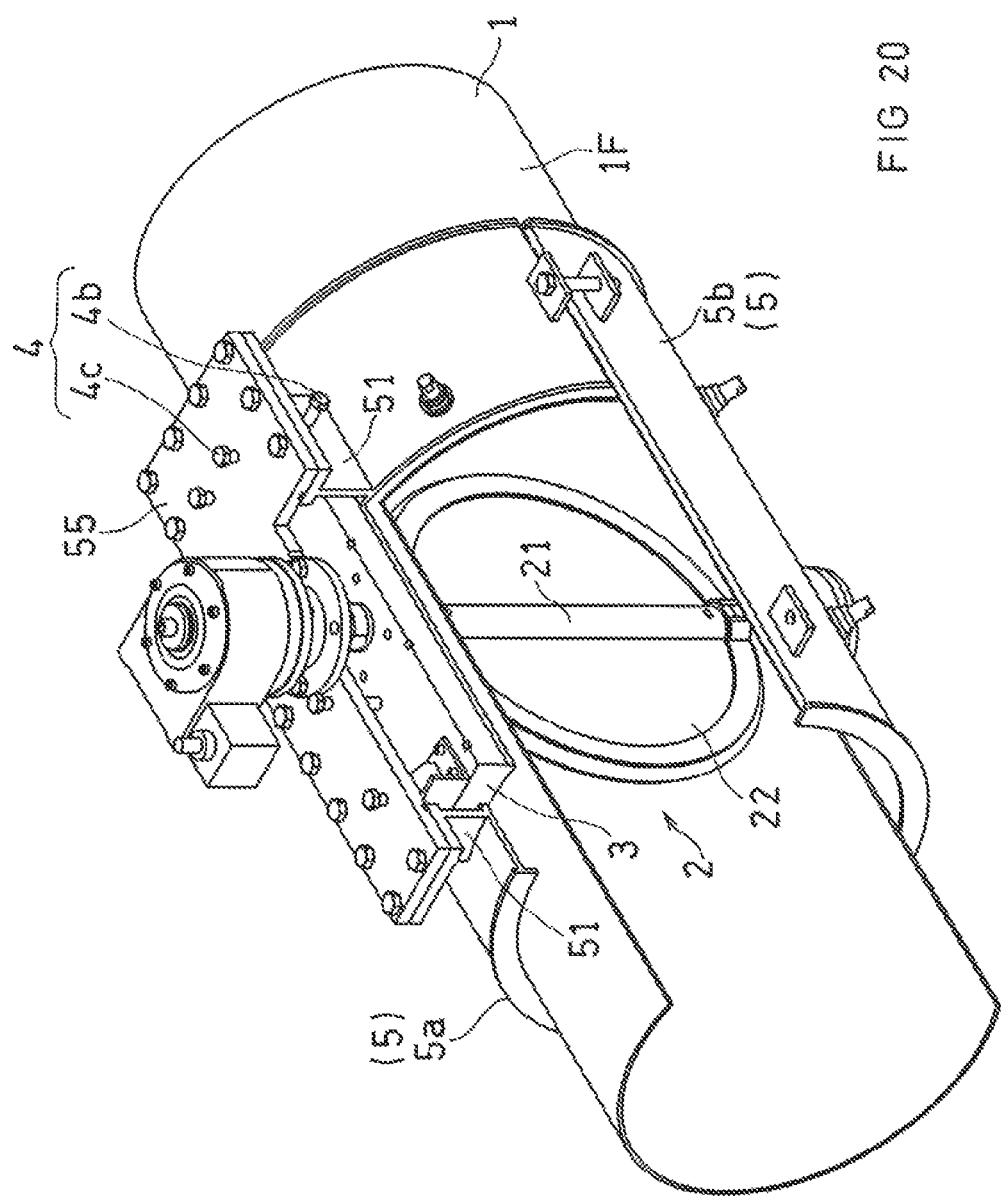

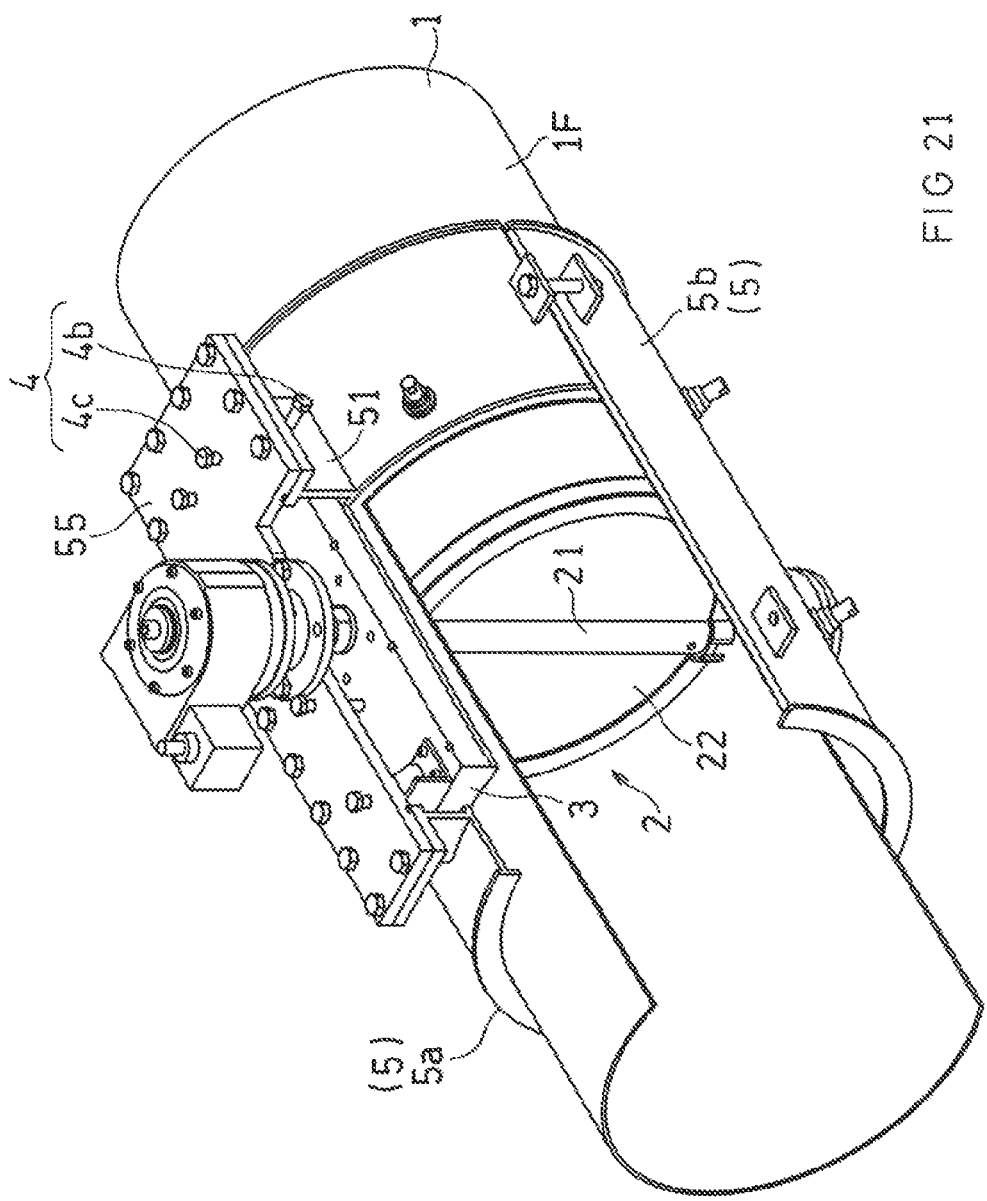

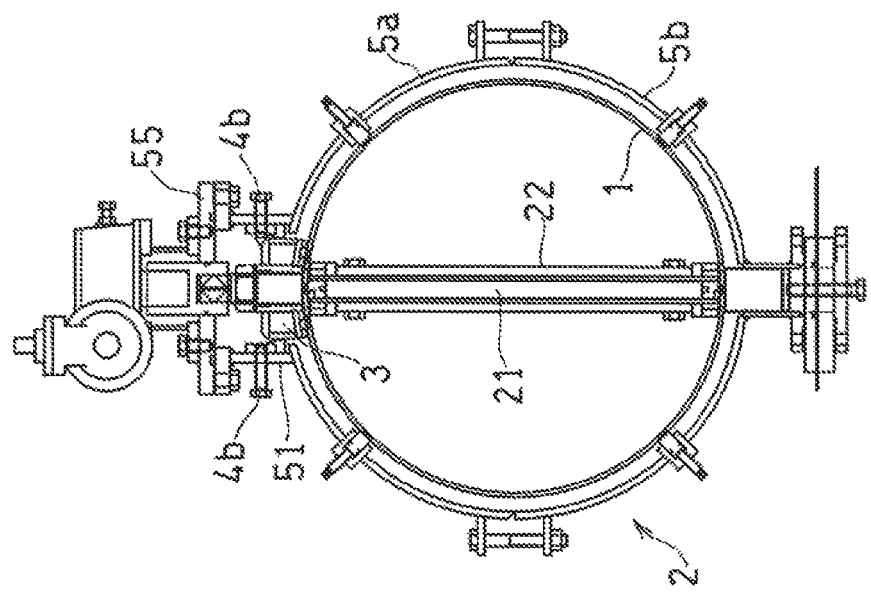
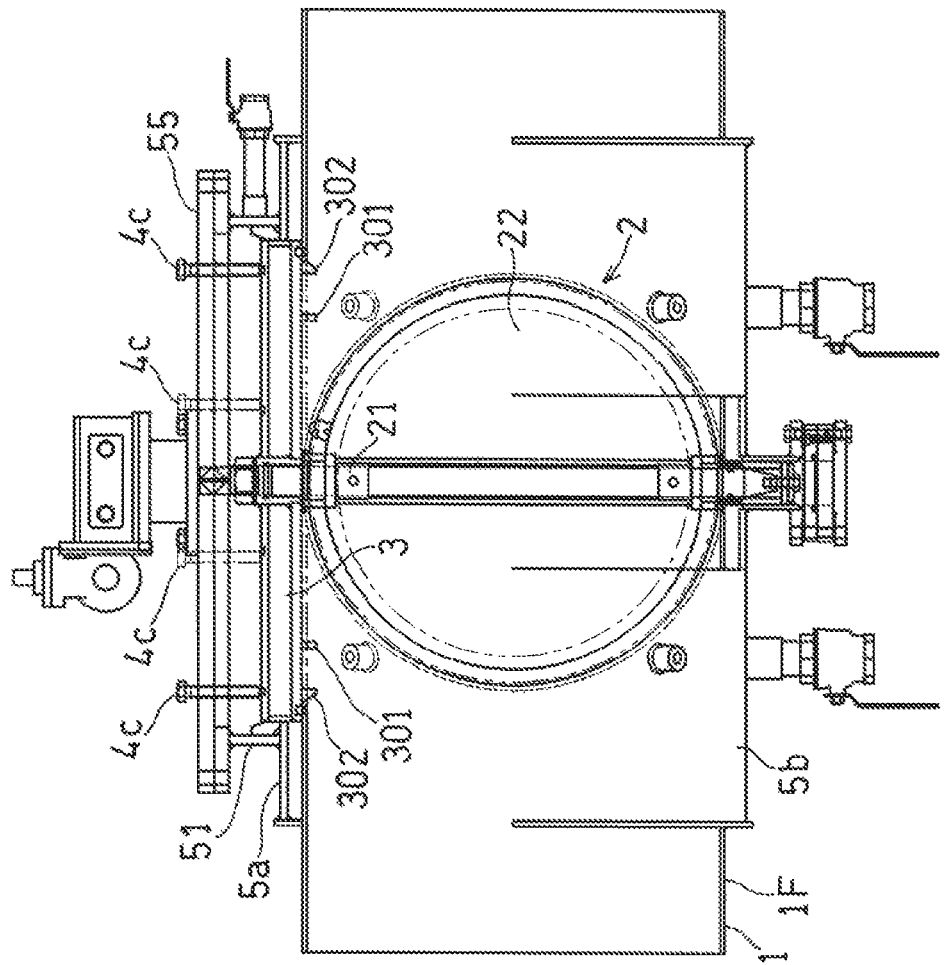

US 10,989,310 B2

INSERTION OF BUTTERFLY VALVE WITHOUT DISRUPTING FLOW

TECHNICAL FIELD

The present invention relates to insertion of a butterfly valve without disrupting the flow.

BACKGROUND ART

Techniques for inserting a butterfly valve into a pipeline of an existing pipe without disrupting the flow therethrough are well known in the art. It is also known in the art to form a groove, which is elongated in the pipe axis direction of the existing pipe, in the existing pipe, and insert the valve element of the butterfly valve, which is to be in contact with the inner circumferential surface of the existing pipe, into the existing pipe.

CITATION LIST

Patent Document

[FIRST PATENT DOCUMENT] JP2000-130682 A (FIGS. 1-10)

SUMMARY OF INVENTION

However, with the conventional technique, the inner lid itself of the butterfly valve fits in a straight-line-shaped cut groove. Such a fitting structure will make the valve insertion difficult.

On the other hand, when there is a gap between the cut groove and the inner lid, the fluid may be caused to leak from upstream to downstream through the gap when the valve is closed. That is, it will lower the water-stopping capacity of the butterfly valve.

With the conventional technique, the rubber on the upper portion of the valve element is in constant contact with the sheet rubber of the inner lid with a strong pressure. Rubbers being in constant contact each other under such a pressure may cause the rubbers to adhere together. This will lower the water-stopping capacity.

Thus, it is an object of the present invention to provide a process and a piping structure for inserting a butterfly valve into an existing pipe through a groove formed in the existing pipe, wherein it is possible to facilitate the valve insertion and to improve the water-stopping capacity of the butterfly valve.

The piping structure of the present invention is a piping structure having a butterfly valve installed in an existing pipe, the piping structure including:

an existing pipe 1 that has a first opening 11 of a groove shape elongated in a pipe axis direction S;

an inner lid 3 that shuts the first opening 11;

a valve rod 21 extending in a radial direction D of the existing pipe 1 and an up-down direction, and running through (penetrating) the first opening 11; and a butterfly-shaped valve element (valve body) 22 that is capable of rotating together with the valve rod 21 and is accommodated in the existing pipe 1, the valve element 22 including:

a circular plate-shaped valve main body 22b;

an outer circumferential rubber R1 arranged along an outer circumference of the valve main body 22b; and an upper rubber R2 that is arranged around an upper portion 21B of the valve rod 21 and arranged in a portion of the first opening 11, and rotates together with the valve rod 21, wherein the upper rubber R2 includes a pair of seal portions R22, wherein in a valve-open state where the valve element 22 is open, the seal portions R22 are in a non-sealed state where the seal portions R22 are spaced apart from respective ones of a pair of end faces (edge surfaces) 11f that define the first opening 11 and are elongated in the pipe axis direction S so as not to seal between each end face 11f and the corresponding seal portion R22, whereas in a valve-closed state where the valve element 22 is closed, the seal portions R22 are in a sealed state so as to seal between an inner surface 31 of the inner lid 3 and the seal portions R22 and seal between each end face 11f and the corresponding seal portion R22.

With the present structure, the pair of seal portions R22 are in a non-sealed state where the seal portions R22 are spaced apart from the respective end faces 11f in the valve-open state. Therefore, when inserting the valve element 22 in the valve-open state into the existing pipe 1 through the first opening 11, the valve element 22 can be smoothly inserted into the existing pipe 1 through the first opening 11 without the seal portions R22 contacting the end faces 11f of the first opening 11.

On the other hand, when rotating the valve element 22 about a valve rod 21 so as to bring a butterfly valve 2 into the valve-closed state, the seal portions R22 contact the end faces 11f of the first opening 11. Thus, in the valve-closed state, it is possible to seal between the upper portion of the valve element 22 and the end faces 11f of the first opening 11 of the existing pipe 1.

BRIEF DESCRIPTION OF THE DRAWINGS

FIG. 2 is a schematic perspective view showing the structure of the butterfly valve according to Embodiment 1 of the present invention and a part of the method for installing the same.

FIG. 7 is a schematic cross-sectional view showing, in a see-through manner, a step in the process according to Embodiment 1 of the present invention.

FIG. 8 is a schematic cross-sectional view showing, in a see-through manner, a step in the process according to Embodiment 1 of the present invention.

FIG. 9 is a schematic cross-sectional view showing, in a see-through manner, a step in the process according to Embodiment 1 of the present invention.

FIG. 10 is a schematic cross-sectional view showing, in a see-through manner, a step in the process according to Embodiment 1 of the present invention.

FIG. 12A and FIG. 12B are a schematic vertical-sectional view and a cross-sectional view, respectively, showing the system in a cutting step according to Embodiment 1.

FIG. 13 is a schematic vertical-sectional view showing a state before the insertion of the butterfly valve according to Embodiment 1.

FIG. 16A and FIG. 16B are a schematic vertical-sectional view and a cross-sectional view, respectively, showing a state immediately after the completion of insertion of the butterfly valve according to Embodiment 1.

FIG. 17A and FIG. 17B are a schematic vertical-sectional view and a cross-sectional view, respectively, where a decelerator is attached to the butterfly valve according to Embodiment 1.

FIG. 20 is a partially-cutaway schematic perspective view showing the butterfly valve according to Embodiment 3 in the valve-open state.

FIG. 21 is a partially-cutaway schematic perspective view showing the butterfly valve according to Embodiment 3 in the valve-closed state.

FIG. 22A and FIG. 22B are a cross-sectional view and a vertical-sectional view, respectively, showing the butterfly valve in the valve-open state.

In FIG. 23A, FIG. 23B and FIG. 25, the cross section of the outer circumferential rubber is shown in gray so that it is easier to see the cross-sectional shape of the outer circumferential rubber.

In FIG. 27 to FIG. 33, the lid rubber is shown in gray so that it is easier to see the shape of the lid rubber.

DESCRIPTION OF EMBODIMENTS

Figure 1A:
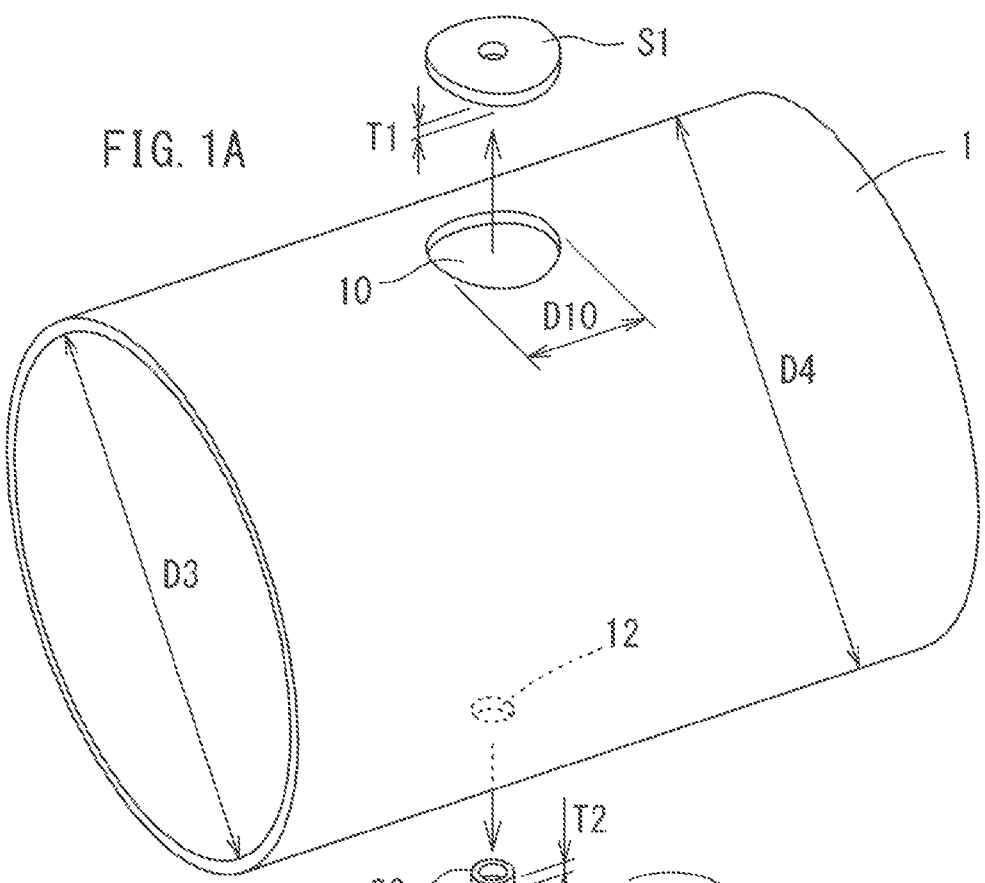
FIG. 1A and FIG. 1B are schematic perspective views each showing the structure of the butterfly valve according to Embodiment 1 of the present invention and a part of the method for installing the same.

Preferably, the pair of seal portions R22 are each formed as a large-diameter portion (convex portion) R22 that protrudes along a direction Dx in which the outer circumferential rubber R1 extends; and the large-diameter portion R22 has a top surface F1 that is in contact with an inner surface 31 of the inner lid 3 in the valve-closed state and a tip end face F2 that is in contact with the corresponding end face 11$f$ in the valve-closed state.

In this case, in the valve-closed state, the top surface F1 of the large-diameter portion R22 is in contact with the inner surface 31, and the tip end face F2 of the large-diameter portion R22 is in contact with the end face 11$f$ of the first opening 11, thereby sealing the upper portion of the butterfly valve.

Preferably, the upper rubber R2 is formed in a loop shape and a disc shape that define a through hole Ro through which the valve rod 21 runs.

In this case, the upper rubber R2 is formed in a loop shape or a disc shape, and the upper rubber R2 is stably secured on the upper portion of the butterfly valve.

Preferably, the upper rubber R2 includes the large-diameter portions R22 and a pair of small-diameter portions (concave portions) R21, which have a diameter D1 smaller than a diameter D2 of the large-diameter portions R22, continuously alternating with each other in a circumferential direction of the upper rubber R2.

With the present structure, the upper rubber R2 includes the small-diameter portions R21 having a smaller diameter, and the large-diameter portions R22 having a larger diameter.

Therefore, when the valve element 22 in the valve-open state is inserted into the existing pipe 1 through the first opening 11, the valve element 22 can be smoothly inserted into the existing pipe 1 through the first opening 11 without the small-diameter portions R21 contacting the end faces 11$f$ of the first opening 11.

On the other hand, when the valve element 22 is rotated about the valve rod 21 so as to bring the butterfly valve 2 into the valve-closed state, large-diameter portions R22 contact the end faces 11$f$ of the first opening 11. Thus, in the valve-closed state, it is possible to seal between the upper portion of the valve element 22 and the end faces 11$f$ of the first opening 11 of the existing pipe 1.

With a preferred structure, a loop-shaped lid rubber R that seals between the inner lid 3 and an outer circumferential surface 1F of the existing pipe 1 is secured on the inner surface of the inner lid 3.

In this case, it is possible to seal between the existing pipe 1 and the inner lid 3 only by pressing the inner lid 3 against the outer circumferential surface 1F of the existing pipe 1. Therefore, there is no need to fit the inner lid 3 into the first opening 11, which will facilitate the valve insertion without disrupting the flow.

More preferably, the lid rubber R includes an auxiliary seal portion R4 that is in contact with the seal portion R22 in the valve-closed state.

In this case, in the valve-closed state where the valve element 22 is closed, the large-diameter portion R22 of the upper rubber R2 contact the auxiliary seal portion R4, thereby sealing between the lid rubber R and the upper rubber R2. This further improves the water-stopping capacity.

Preferably, in the valve-closed state, a space inside the existing pipe 1 is divided by the valve element 22 into an upstream side Sf where a fluid pressure acts in the existing pipe 1 and a downstream side Df where a fluid pressure in the existing pipe 1 is depressurized; and a self-seal groove G1, G2 is formed on the upstream side Sf of the outer circumferential rubber R1, wherein in the valve-closed state, the self-seal groove G1, G2 receives the fluid pressure to press an outer circumference end portion R10 of the outer circumferential rubber R1 against an inner circumferential surface 1S of the existing pipe 1.

In this case, the fluid pressure on the upstream side is applied via the self-seal groove G1, G2, thereby pressing the outer circumferential rubber R1 against the inner circumferential surface 1S of the existing pipe 1. Thus, the compression margin (allowance) of the outer circumferential rubber R1 is small, thereby reducing the rotation torque when closing the valve.

More preferably, the outer circumferential rubber R1 comprises a first half-ring rubber R11 and a second half-ring rubber R12;

the first half-ring rubber R11 is attached to an area of the valve element 22 that rotates from the upstream side Sf toward the downstream side Df when the valve element 22 is closed;

the second half-ring rubber R12 is attached to an area of the valve element 22 that rotates from the downstream side Df toward the upstream side Sf when the valve element 22 is closed; and the outer circumference end portion R10 of the first half-ring rubber R11 has a higher rigidity than the outer circumference end portion R10 of the second half-ring rubber R12.

The first half-ring rubber R11 has a low rigidity, thereby contributing to reducing the rotation torque when closing the valve.

On the other hand, the second half-ring rubber R12 has a high rigidity, and it is therefore possible to prevent the outer circumference end portion R10 from deforming (flipping) inadvertently when closing the valve.

Preferably, the piping structure includes a press tool (fastener) 4 that presses the inner surface 31 of the inner lid 3 against the outer circumferential surface 1F of the existing pipe 1, thereby compressing the lid rubber R between the outer circumferential surface 1F of the existing pipe 1 and the inner surface 31 of the inner lid 3.

In this case, the lid rubber R is compressed between the existing pipe 1 and the inner lid 3, thereby increasing the watertightness between the outer circumferential surface 1F of the existing pipe 1 and the inner surface 31 of the inner lid 3.

Preferably, the existing pipe 1 defines a circular second opening 12 at a position that opposes the first opening 11; and the valve rod 21 has a lower end portion 21T that runs through the second opening 12 with a portion thereof further protruding from the existing pipe 1.

In this case, by supporting the lower end portion 21T protruding from the second opening 12, it is possible to axially support the upper end portion (an example of the upper portion) 21B and the lower end portion 21T of the valve rod 21, i.e., the opposite end portions of the valve rod 21. Therefore, it is possible not only to reduce the weight of the valve element 22 or the valve rod 21, but also to improve the water-stopping capacity by reducing the distortion of the butterfly valve.

More preferably, the piping structure further includes a rubber ring R3 that is attached to the lower end portion 21T of the valve rod 21 and seals between the lower end portion 21T of the valve rod 21 and the inner circumferential surface 18S of the existing pipe 1.

Such a rubber ring R3 enhances the water-stopping capacity of the lower end portion 21T.

More preferably, the piping structure includes a press tool 4 that presses the inner lid 3 against the outer circumferential surface 1F of the existing pipe 1, thereby:

a. pressing the upper rubber R2 against the inner surface 31 of the inner lid 3; and b. pressing the rubber ring R3 against the inner circumferential surface 1S of the existing pipe 1.

When the butterfly valve transitions from the valve-open state to the valve-closed state, portions of the valve element 22 that are far away from the valve rod 21 rotate along large arcs. Therefore, the outer circumferential rubber R1 at such a position has a large compression margin, and therefore realizes a high watertightness.

On the other hand, when the valve is closed, portions of the valve element 22 that are close to the upper end portion 21B and the lower end portion 21T of the valve rod 21, i.e., the upper rubber R2 and the rubber ring R3 are unlikely to have a sufficient compression margin. Therefore, there is a need to compress the upper rubber R2 and the rubber ring R3 in the axial direction of the valve rod 21 in advance in the valve-open state.

With the present embodiment, the upper rubber R2 and the rubber ring R3 can be compressed in advance in the axial direction of the valve rod 21 by the press tool 4. Therefore, a high watertight property is exhibited.

Preferably, the piping structure further includes a sealed case 5 that covers areas of the existing pipe 1 where the first and second openings 11, 12 are formed, the upper end portion 21B and the lower end portion 21T of the valve rod 21, and the inner lid 3, wherein the sealed case 5 includes a first protruding pipe portion 51 that covers (surrounds) the inner lid 3 from four directions, and an outer lid 55 that is connected to the first protruding pipe portion 51 to cover the inner lid 3.

Preferably, the press tool 4 includes:

a plurality of first pressing bolts (fastening bolts) 4b that are supported on a pipe wall of the first protruding pipe portion 51 and are moved forward and backward along a tangential direction to the existing pipe 1 so as to press the inner lid 3 against the outer circumferential surface of the existing pipe 1; and a plurality of second pressing bolts (fastening bolts) 4c that are supported on a pipe wall of the outer lid 55 and are moved forward and backward along the radial direction of the existing pipe 1 so as to press the inner lid 3 against the outer circumferential surface 1F of the existing pipe 1.

In this case, first, the inner lid 3 is fastened by the first pressing bolts 4b. Next, the outer lid 55 is connected to the first protruding pipe portion 51 so as to cover the inner lid 3 from above. Thereafter, the inner lid. 3 is further fastened by the second pressing bolts 4c.

Thus, by fastening the inner lid 3 by the second pressing bolts 4 in addition to the first pressing bolts 4b, it is possible to increase the stroke by which the inner lid 3 is fastened. This therefore improves the sealing reliability between the upper portion of the valve element 22 and the inner lid 3.

The present structure can be obtained by a preferred process as follows, for example.

One process is a process of installing a butterfly valve 2 into an existing pipe 1, the process including:

an assembly step of assembling a sealed case 5 onto the existing pipe 1 for airtightly enclosing a portion of the existing pipe 1;

a cutting step of using a cutting tool 60 that has been brought into the sealed case 5 to form a first opening 11 of a groove shape elongated in a pipe axis direction S;

a boring step of using a boring tool 62 that has been brought into the sealed case 5 to bore a circular second opening 12 at a position that opposes the first opening 11;

an insertion step (of inserting, in a valve-open state, a butterfly-shaped valve element 22 that is integral with a valve rod 21, which runs through the first and second openings 11, 12, into the existing pipe 1 through the first opening 11 until a lower end portion 21T of the valve rod 21 protrudes from the second opening 12; and a collar attachment step of attaching a collar 53 to an outer circumference of the lower end portion 21T of the valve rod 21 that has been brought into a bearing portion 50 of the sealed case 5 in the insertion step.

With this process, the collar 53 is attached to the outer circumference of the lower end portion 21T of the valve rod 21 that has been brought into the bearing portion 50 of the sealed case 5 in the insertion step. Therefore, in the insertion step, there is a large clearance between the lower end portion 21T of the valve rod 21 and the bearing portion 50 of the sealed case 5, and the lower end portion 21T of the valve rod 21 can be easily guided to the bearing portion 50. On the other hand, after the collar attachment step, the lower end portion 21T can be precisely supported on the bearing portion 50 of the sealed case 5. Thus, the insertion of the valve element 22 can be done smoothly, and one can expect a high water-stopping capacity after the insertion.

Preferably, the process further includes a sealing step of pressing an inner lid 3 that shuts the first opening 11, thereby compressing a loop-shaped lid rubber R that seals between the inner lid 3 and the existing pipe 1, wherein the sealing step is performed after the collar attachment step.

If the sealing step is performed first before the collar attachment step, the axial line of the valve rod 21 is more likely to be misaligned. In contrast, by performing the sealing step after centering the axial line of the valve rod 21 through the collar attachment step, it is possible to precisely support the valve rod 21 and one can expect a high water-stopping capacity.

Preferably, the piping structure includes, on an inner surface side of the inner lid 3, a first engagement projection 301 that protrudes toward the first opening 11 and engages with the end face 11f of the first opening 11 in a circumferential direction of the existing pipe 1, and a second engagement projection 302 that protrudes toward the first opening 11 and engages with the end face 11f of the first opening 11 in the pipe axis direction S.

While the inner lid 3 is pressed against the outer circumferential surface 1F of the existing pipe 1, if the inner lid 3 is misaligned with the first opening 11, the upper rubber R2 of the butterfly valve 2 attached to the inner lid 3 is misaligned with the first opening 11, and the sealing capacity of the upper rubber R2 is likely to lower.

In contrast, with the first and second engagement projections 301, 302 engaging with the end face 11f of the first opening 11 in the pipe axis direction S and in the circumferential direction, it is possible to prevent the misalignment. This increases the reliability of sealing the first opening 11.

Preferably, an inner diameter D3 of the existing pipe 1 is larger than an outer diameter D4 of the outer circumferential rubber R1.

Thus, with the outer diameter D4 of the outer circumferential rubber R1 being larger than the inner diameter D3 of the existing pipe 1, the valve element 22 can stop the flow of a fluid in the existing pipe 1.

Another preferred process is a process of installing a butterfly 2 into an existing pipe 1, the process including:

an assembly step of assembling a sealed case 5 onto the existing pipe 1 for airtightly enclosing a portion of the existing pipe 1;

a first boring step of using a first hole saw 61 that has been brought into the sealed case 5 to cut off a circular first cut piece S1 and form a circular opening 10 in the existing pipe 1;

a cutting step of using a cutting tool 60 that has been brought into the sealed case 5 to form a first opening 11 of a groove shape that extends on both sides from the circular opening 10 in the pipe axis direction S of the existing pipe 1;

a second boring step of using a second hole saw 62 that has been brought into the sealed case 5 to cut off a second cut piece 82 and form a circular second opening 12 at a position that opposes the circular opening 10; and an insertion step of inserting, in a valve-open state, a butterfly-shaped valve element 22 that is integral with a valve rod 21, which runs through the first and second openings 11, 12, into the existing pipe 1 through the first opening 11 until a lower end portion 21T of the valve rod 21 protrudes from the second opening 12.

In this case, the valve rod 21 can be supported at portions of the valve rod 21 in the vicinity of the first and second openings 11, 12, i.e., at both of the upper end portion 21B and the lower end portion 21T of the valve rod 21.

A boring operation is performed by a first hole saw 61 separately from the cutting operation of forming the groove. Thus, the first opening 11 is formed having a shape in conformity with the shape of the butterfly valve 2.

Preferably, a width W11 of the groove-shaped first opening 11 formed by the cutting tool 60 is smaller than a diameter D10 of the circular opening 10 formed by the first hole saw 61.

In this case, there is obtained a large circular opening 10 in conformity with the dimension around the valve rod 21 of the butterfly valve 2.

Preferably, the process includes:

a step of measuring the outer diameter D4 of the existing pipe 1;

a step of measuring thicknesses T1, T2 of the first and second cut pieces S1, 82; and a step of calculating the inner diameter D3 of the existing pipe 1 by subtracting thicknesses T1, T2 of the first and second cut pieces S1, S2 from the measured outer diameter D4.

Pipes are manufactured based on their outer diameters, and an inner diameter of a pipe is not uniquely determined based on its outer diameter, which may cause the water-stopping capacity of the butterfly valve 2 to lower. The existing pipe 1 may have uneven portions.

In contrast, by obtaining the first and second cut pieces S1, S2, and calculating the inner diameter D3 based on the thicknesses T1, T2 and the outer diameter D4 of the existing pipe 1, it is possible to know the accurate inner diameter D3 of the existing pipe 1. This improves the water-stopping capacity.

Preferably, a process of installing a butterfly 2 into an existing pipe 1, the process comprising:

an assembly step of assembling a sealed case 5 onto the existing pipe 1 for airtightly enclosing a portion of the existing pipe 1;

a cutting step of using a cutting tool 60 that has been brought into the sealed case 5 to form a first opening 11 of a groove shape that extends in a pipe axis direction S of the existing pipe 1;

a boring step of using a hole saw 62 that has been brought into the sealed case 5 to cut off a cut piece 82 and form a circular second opening 12 at a position that opposes the first opening 11;

an insertion step of inserting, in a valve-open state, a butterfly-shaped valve element 22 that is integral with a valve rod 21, which runs through the first and second openings 11, 12, into the existing pipe 1 through the first opening 11 until a lower end portion 21T of the valve rod 21 protrudes from the second opening 12;

a step of measuring an outer diameter D4 of the existing pipe 1;

a step of measuring a thickness T2 of the cut piece S2; and a step of calculating an inner diameter D3 of the existing pipe 1 by subtracting, from the measured outer diameter D4, a value that is obtained by multiplying a thickness T2 of the cut piece 82 by two.

In this case, by obtaining the cut piece 82 and calculating the inner diameter D3 from the thickness T2 and the outer diameter D4 of the existing pipe 1, it is possible to know an accurate inner diameter D3 of the existing pipe 1. This improves the water-stopping capacity.

Another preferred example is a system for installing a butterfly valve 2 into an existing pipe 1, the system comprising:

a sealed case 5 that airtightly encloses a portion of the existing pipe 1 and has a first protruding pipe portion 51 that protrudes in a radial direction D of the existing pipe 1;

an operation valve V that is connected to the first protruding pipe portion 51 of the sealed case 5;

a slider 7 that is arranged on an opposite side of the operation valve V with respect to the first protruding pipe portion 51 and is movable along a pipe axis direction S of the existing pipe 1;

an operation case 8 that is connected on an opposite side of the operation valve V with respect to the first protruding pipe portion 51 and slidably supports the slider 7, and has an airtight chamber 80 for applying, on a second surface 72 of the slider 7 on an opposite side from the first surface 71, a pressure that resists an internal pressure in the existing pipe 1 that is applied on the first surface 71 of the slider 7;

a mover 70 for moving the slider 7 relative to the operation case 8 along the pipe axis direction S; and a cutting tool 60 that is connected to the slider 7 and is protruding toward the existing pipe 1, wherein the cutting tool 60 forms, in the existing pipe 1, a first opening 11 of a groove shape elongated along the pipe axis direction S as the slider 7 moves.

A preferred process using such a system is a process of installing a butterfly valve 2 into an existing pipe, the process including:

an assembly step of assembling the sealed case 5 onto the existing pipe 1 so that the sealed case 5 airtightly encloses a portion of the existing pipe 1;

a cutting step of using the cutting tool 60 that has been brought into the sealed case 5 to form a first opening 11 of a groove shape elongated in the pipe axis direction S; and an insertion step of inserting a butterfly-shaped valve element 22 that is integral with a valve rod 21, which runs through the first opening 11, into the existing pipe 1 through the first opening 11 in a valve-open state, the insertion step including:

a moving step of moving the slider 7 in the pipe axis direction S by means of the mover 70, thereby moving the cutting tool 60 in the pipe axis direction S; and a pressurizing step of introducing a pressure fluid into the airtight chamber 80, thereby applying a pressure on a second surface 72 of the slider 7.

With such a system or process, the slider 7, separate from the operation valve V, moves in the pipe axis direction S, thereby moving the cutting tool 60 in the pipe axis direction S. Therefore, it is possible to accurately form the first opening 11 as compared with a case where the sealed case 5 is slid.

A pressure fluid is introduced into the airtight chamber 80, thereby moving the slider 7 while applying a pressure on the second surface 72 of the slider 7. Therefore, it is possible to prevent an uneven pressure on the slider 7, and to make it easier to move the slider 7.

Preferably, a structure of a butterfly valve installed in an existing pipe includes:

the existing pipe 1 that has a first opening 11 of a groove shape elongated in a pipe axis direction S;

an inner lid 3 that shuts the first opening 11;

a valve rod 21 extending in a radial direction D of the existing pipe 1, and running through the first opening 11; and a butterfly-shaped valve element 22 that is capable of rotating together with the valve rod 21 and is accommodated in the existing pipe 1, the valve element 22 including:

a circular plate-shaped valve body 22b;

an outer circumferential rubber R1 arranged along an outer circumference of the valve body 22b;

an upper rubber R2 that is arranged around an upper end portion 21B of the valve rod 21 and arranged in a portion of the first opening 11, and is in contact with an inner surface 31 of the inner lid 3;

a first saddle that covers an area of the existing pipe 1 where the first opening 11 is formed, the upper end portion 21B of the valve rod 21, and the inner lid 3;

a second saddle that covers an area of the existing pipe 1 where the second opening 12 is formed, and a lower end portion 21T of the valve rod 21;

a plurality of bands extending in a circumferential direction between the first saddle and the second saddle; and a plurality of fastening bolts for fastening together the bands and the saddles.

In this case, both of the first and second saddles are small in the circumferential direction, and therefore the first and second saddles are more likely to fit along the outer circumferential surface of the existing pipe 1.

Any feature illustrated and/or depicted in conjunction with one of the aspects described above or the following embodiments may be used in the same or similar form in one or more of alternative aspects or alternative embodiments, and/or may be used in combination with, or in place of, any feature of the alternative aspects or embodiments.

The present invention will be understood more clearly from the following description of preferred embodiments taken in conjunction with the accompanying drawings. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Embodiments

Embodiment 1 of the present invention will now be described with reference to the drawings.

Referring to FIG. 1A to FIG. 6B, the structure of the present butterfly valve will be outlined.

Figure 5A:
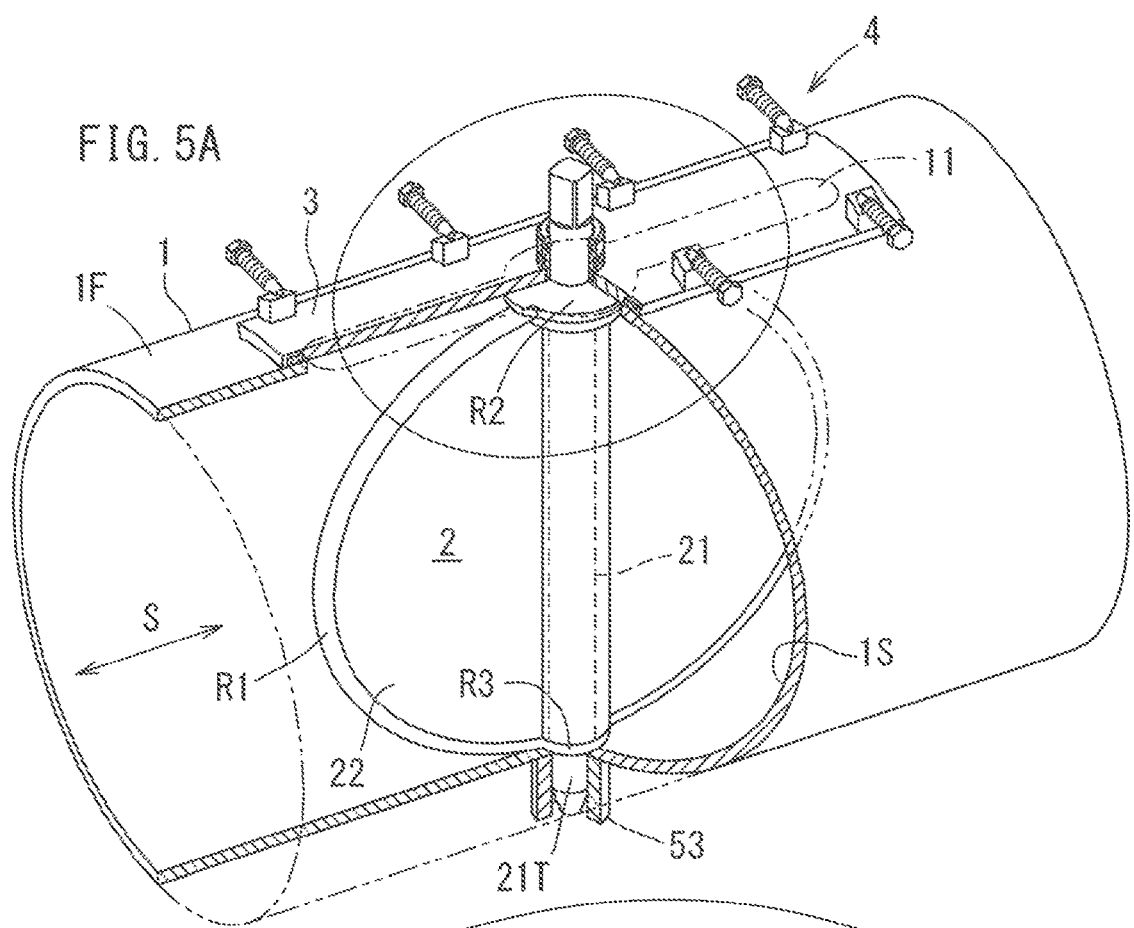
FIG. 5A and FIG. 5B are schematic perspective views each showing the structure of the butterfly valve according to Embodiment 1 of the present invention and a part of the method for installing the same.

As shown in FIG. 5A, the present butterfly valve 2 is installed in the existing pipe 1.

The butterfly valve 2 includes the existing pipe 1, the inner lid 3, the valve rod 21 and the butterfly-shaped valve element 22.

As shown in FIG. 2, the existing pipe 1 has the first opening 11 of a groove shape elongated in the pipe axis direction S. The existing pipe 1 defines the circular second opening 12 at a position that opposes the first opening 11.

The inner lid 3 shuts the first opening 11.

The valve rod 21 extends in the radial direction D of the existing pipe 1 and the up-down direction, and runs through the first opening 11. The valve rod 21 has the lower end portion 21T that runs through the second opening 12 with a portion thereof further protruding from the existing pipe 1.

As shown in FIG. 3, the butterfly-shaped valve element 22 is accommodated in the existing pipe 1 so that the valve element 22 can rotate together with the valve rod 21.

The valve element 22 includes the circular plate-shaped valve main body 22b, the outer circumferential rubber R1, the upper rubber R2 and the rubber ring R3. These rubbers R1 to 3S rotate together with the valve rod 21.

The outer circumferential rubber R1 is arranged along the outer circumference of the valve main body 22b.

Figure 3A:
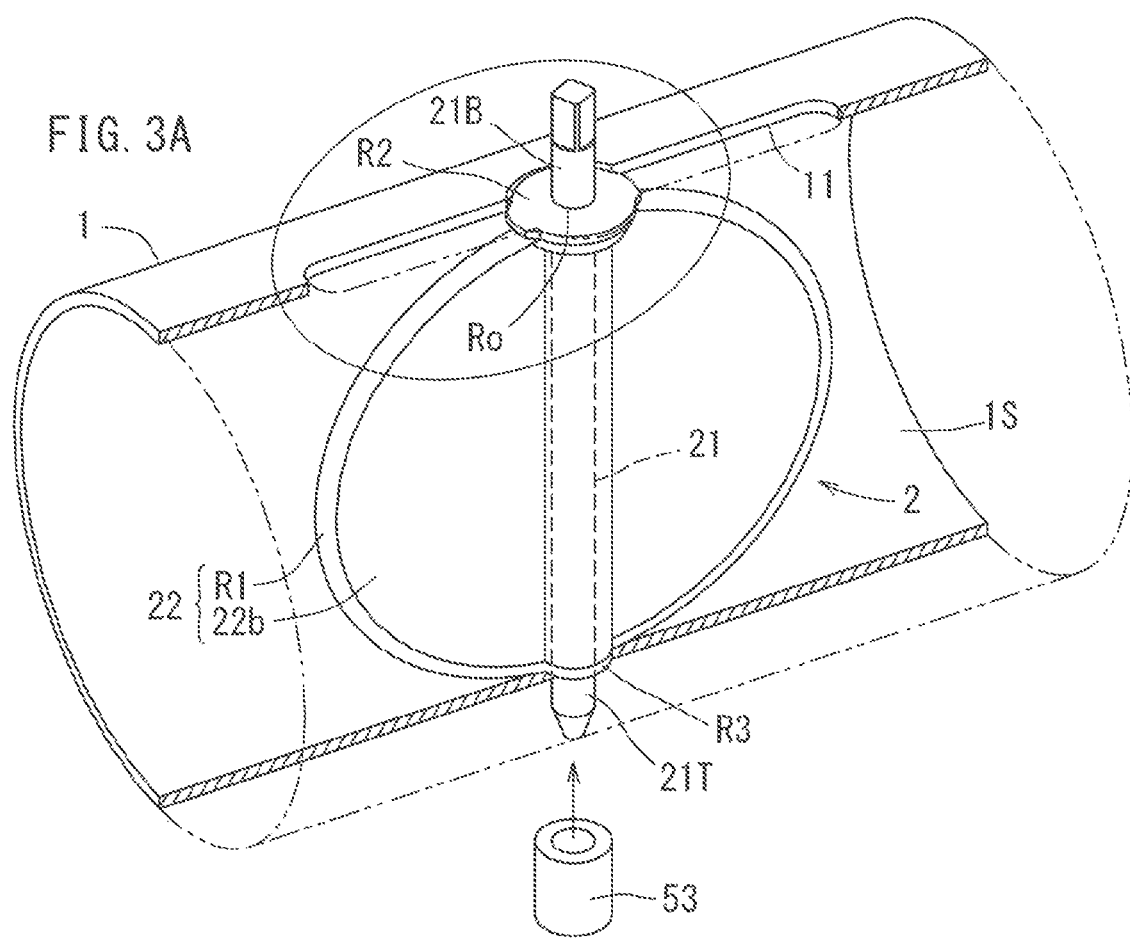
FIG. 3A and FIG. 3B are schematic perspective views each showing the structure of the butterfly valve according to Embodiment 1 of the present invention and a part of the method for installing the same.
Figure 4A:
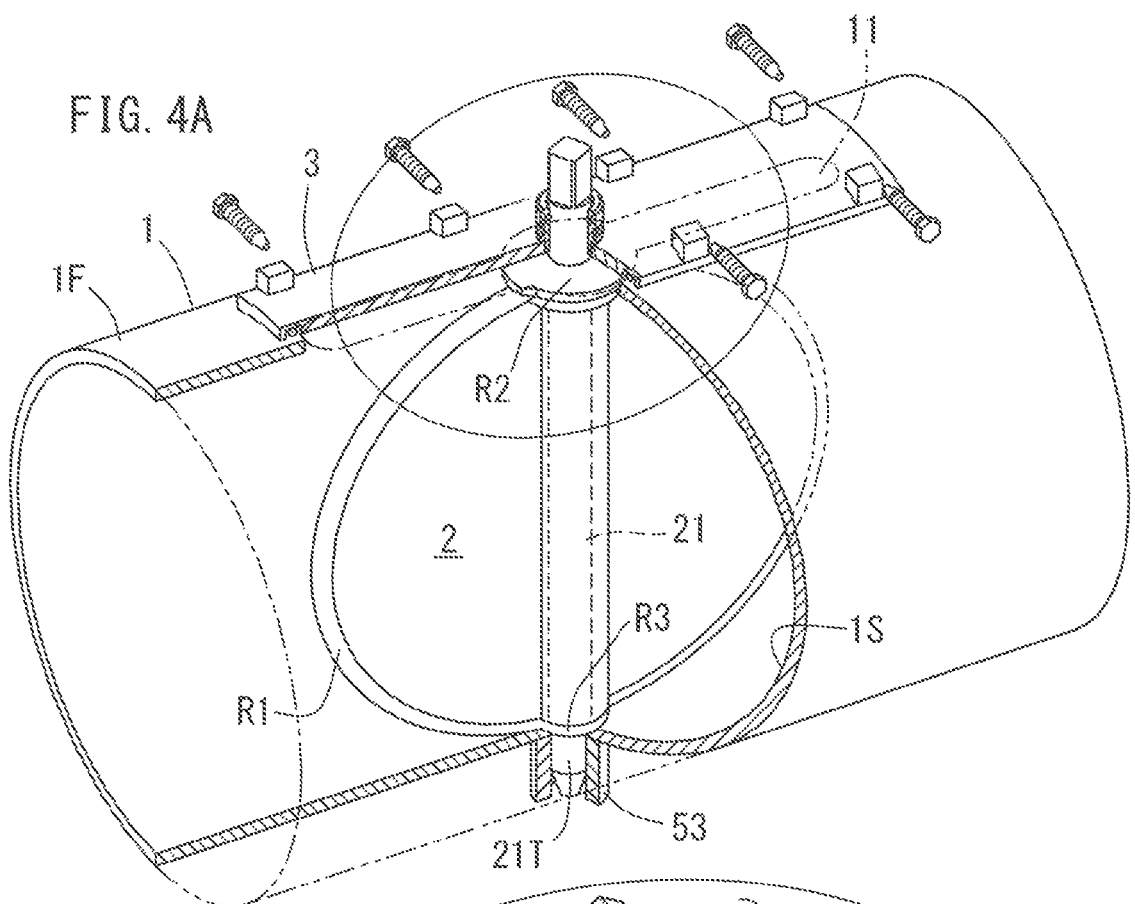
FIG. 4A and FIG. 4B are schematic perspective views each showing the structure of the butterfly valve according to Embodiment 1 of the present invention and a part of the method for installing the same.
Figure 4B:
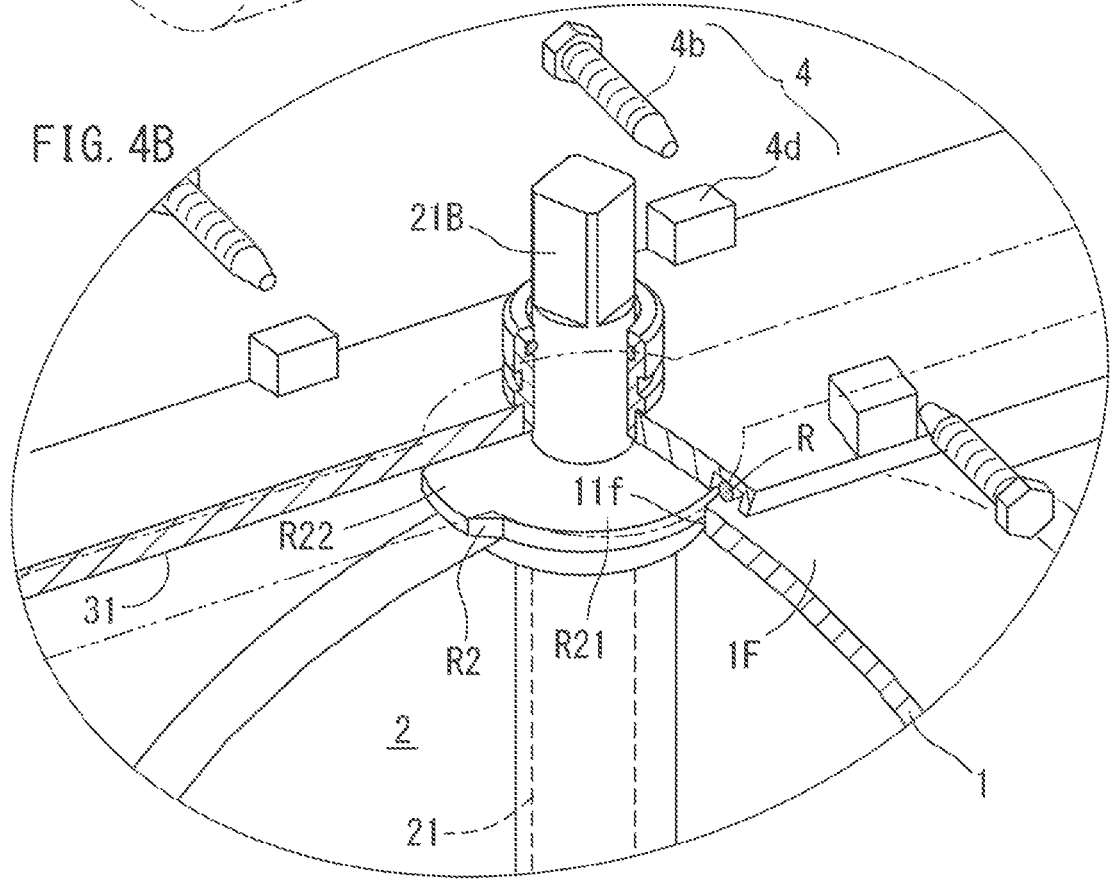

The upper rubber R2 of FIG. 3A is arranged around the upper portion 21B of the valve rod 21 and arranged in a portion of the first opening 11, and is in contact with the inner surface 31 of the inner lid 3 of FIG. 4B. The upper rubber R2 has the through hole Ro through which the upper portion 21B of the valve rod 21 runs.

The rubber ring R3 is attached to the lower end portion 21T of the valve rod 21 and seals between the lower end portion 21T of the valve rod 21 and the inner circumferential surface 1S of the existing pipe 1.

Figure 3B:
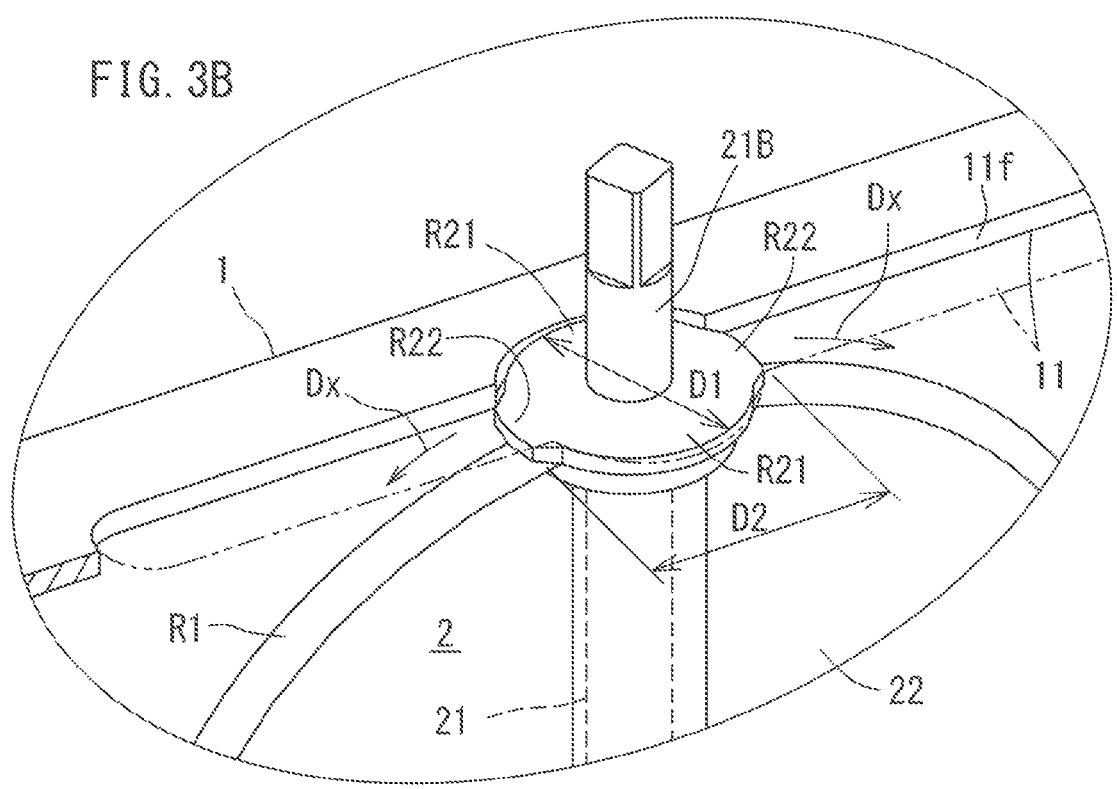

The upper rubber R2 of FIG. 3B includes a pair of small-diameter portions R21 and a pair of large-diameter portions (an example of the seal portions) R22.

The two small-diameter portions R21 of FIG. 3B have the first diameter D1 such that they are not in contact with the end face 11f of the first opening 11 in the valve-open state where the valve element 22 is open.

Figure 6A:
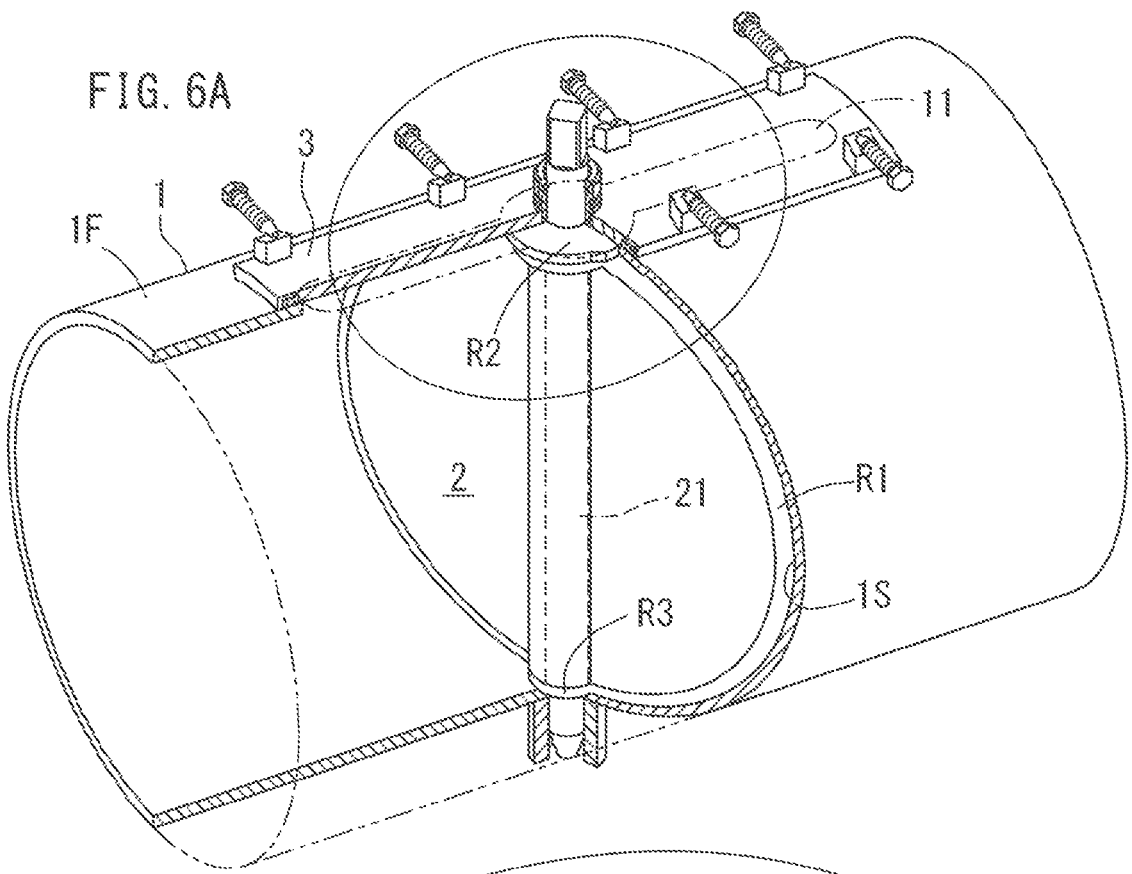
FIG. 6A and FIG. 6B are schematic perspective views each showing the structure of the butterfly valve according to Embodiment 1 of the present invention and a part of the method for installing the same.
Figure 6B:
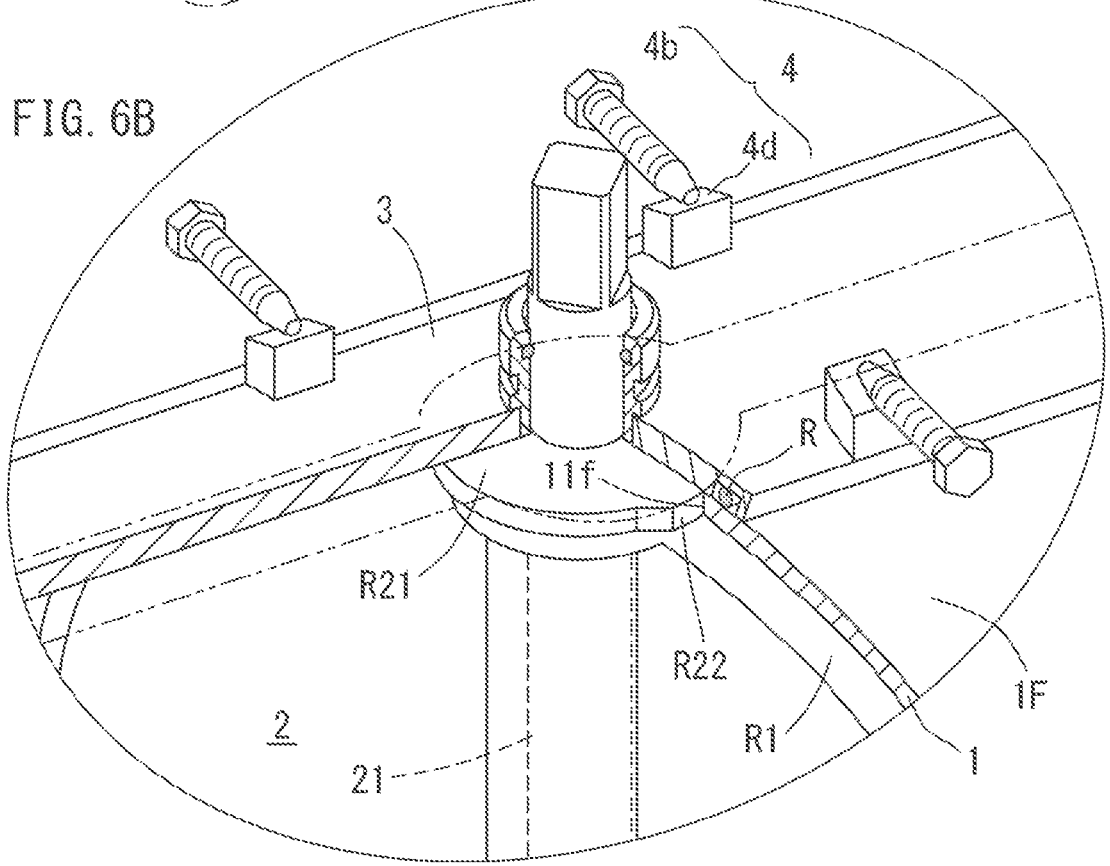

The two large-diameter portions R22 of FIG. 3B have a second diameter D2 (FIG. 3B) that is larger than the first diameter D1 such that they are in contact with the end face 11f of the first opening 11 in the valve-closed state where the valve element 22 is closed as shown in FIG. 6B.

That is, the radius of the large-diameter portion R22 is larger than the radius of the small-diameter portion R21.

In FIG. 6B, the lid rubber R is provided on the inner lid 3. The lid rubber R is a loop-shaped rubber (see FIG. 19B) that seals between the inner lid 3 and the outer circumferential surface 1F of the existing pipe 1, and is secured on the inner surface of the inner lid 3.

Figure 5B:
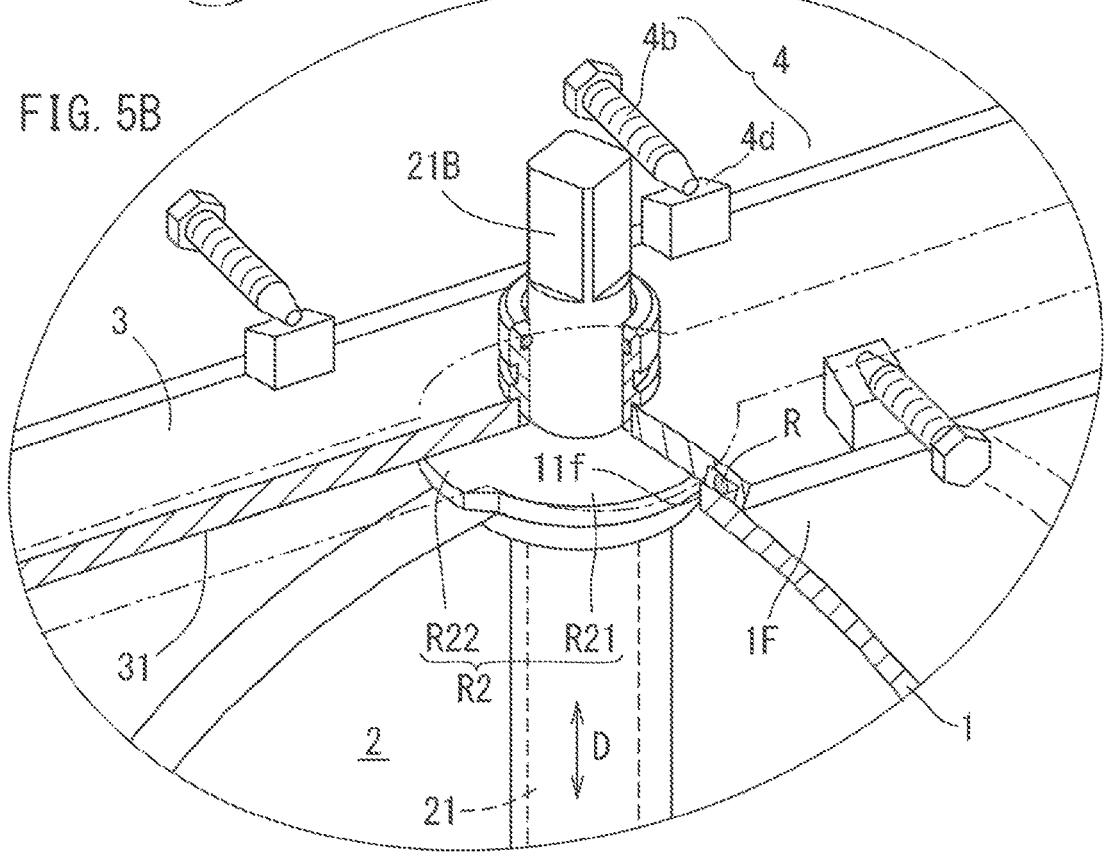

In FIG. 5B, the butterfly valve 2 includes the press tool 4.

The press tool 4 presses the inner surface 31 of the inner lid 3 against the outer circumferential surface 1F of the existing pipe 1, thereby compressing the lid rubber R between the outer circumferential surface 1F of the existing pipe 1 and the inner surface 31 of the inner lid 3.

Moreover, the press tool 4 presses the inner lid 3 against the outer circumferential surface 1F of the existing pipe 1, thereby pressing the upper rubber R2 of FIG. 5A against the inner surface 31 of the inner lid 3 and pressing the rubber ring R3 against the inner circumferential surface 1S of the existing pipe 1.

The inner diameter D3 of the existing pipe 1 of FIG. 2 is smaller than the outer diameter D4 of the outer circumferential rubber R1. Thus, the butterfly valve 2 of FIG. 6A is fully closed at an angle that is smaller than 90°.

As shown in FIG. 17A and FIG. 17B, the sealed case 5 covers areas of the existing pipe 1 where the first and second 2S openings 11, 12 are formed, the upper portion 21B and the lower end portion 21T of the valve rod 21, the inner lid 3, etc.

In FIG. 17A, the sealed case 5 includes first and second divided cases 5a, 5b, for example. A rubber gasket 54 that seals between the divided cases 5a, 5b and the existing pipe 1 and seals between the divided cases 5a, 5b is attached to the divided cases 5a, 5b. The first and second divided cases 5a, 5b are provided integrally with the first and second protruding pipe portions 51, 52, respectively.

A decelerator 9 is attached to the first protruding pipe portion 51 of FIG. 17A with the outer lid 55 interposed therebetween. The decelerator 9 is connected to the upper end portion of the valve rod 21.

The inner lid 3 is accommodated in the first protruding pipe portion 51 of FIG. 17B. The inner lid 3 is pressed against the outer circumferential surface 1F of the existing pipe 1 by the press tool 4. The first pressing bolts 4b of the press tool 4 are supported on the pipe wall of the first protruding pipe portion 51.

A small gate valve 56 is connected to the second protruding pipe portion 52 of FIG. 17B. A lid plate 57 is attached to the flange of the small gate valve 56, thereby shutting the second protruding pipe portion 52.

The collar 53 is arranged in the second protruding pipe portion 52 of FIG. 17B. The collar 53 fits to the inside of the second protruding pipe portion 52 and fits to the lower end portion 21T of the butterfly valve 2.

Next, an example of the process (installation method) of installing the butterfly valve 2 into the existing pipe 1 will be outlined.

First, as shown in FIG. 7(a), an assembly step of assembling the sealed case 5 onto the existing pipe 1 for airtightly enclosing a portion of the existing pipe 1 is performed.

Note that deformations of the existing pipe 1 are corrected as necessary using a corrector 90 of FIG. 7(b).

Next, the operation valve V (see FIG. 14B) is attached to the first divided case 5a of FIG. 7(c), and the slider 7 and the operation case 8 are further attached thereto.

Then, a first boring machine 81 is attached to the operation case 8 of FIG. 8(a). On the other hand, the gate valve 56 is attached to the second protruding pipe portion 52, and a second boring machine 82 is further attached thereto.

After the attachment, first and second boring steps of FIG. 8(a) are performed.

That is, a first hole saw 61 that has been brought into the sealed case 5 is used to cut off the circular first cut piece S1 of FIG. 1A and form the circular opening 10 in the existing pipe 1. On the other hand, a second hole saw 62 that has been brought into the sealed case 5 of FIG. 8(a) is used to cut off the second cut piece 82 of FIG. 1A and form the circular second opening 12 at a position that opposes the circular opening 10.

After the first boring step, an end mill-type boring machine 883 is attached to the slider 7 of FIG. 8(b), in place of the first boring machine 81. After the attachment, a cutting step of using the cutting tool 60 that has been brought into the sealed case 5 is performed. The cutting step forms the first opening 11 of a groove shape that extends on both sides from the circular opening 10 in the pipe axis direction S of the existing pipe 1 as shown in FIG. 9(a) and FIG. 1B.

Figure 1B:
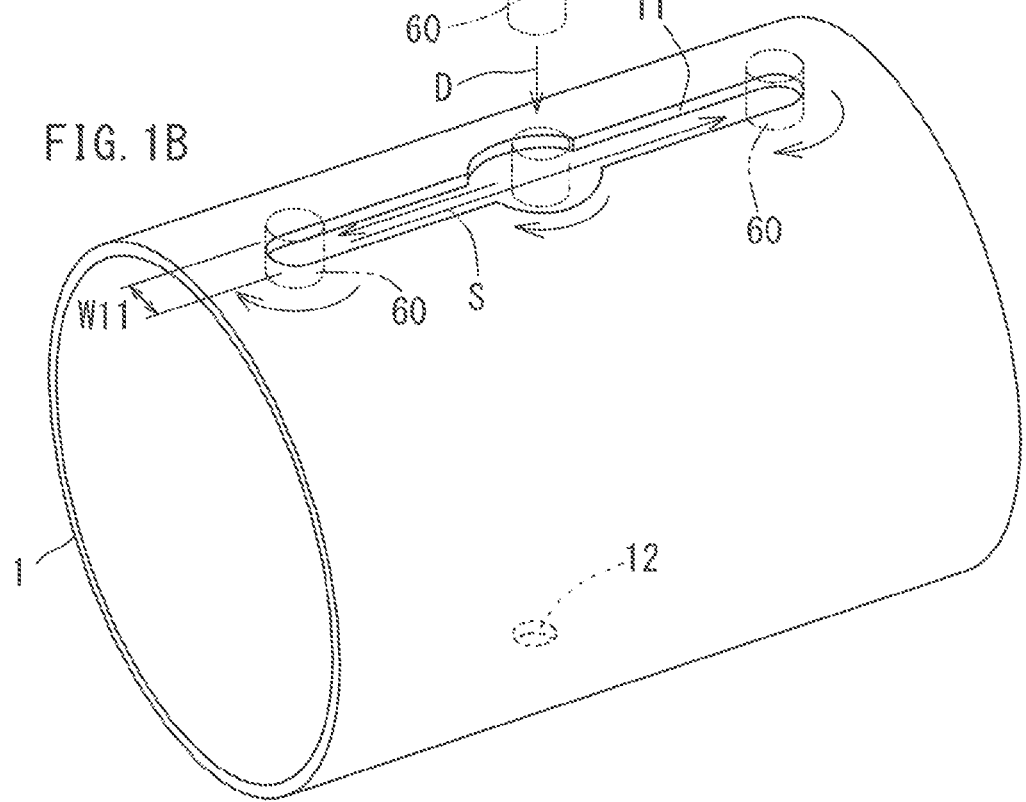

Herein, the width W11 of the groove-shaped first opening 11 formed by the cutting tool 60 of FIG. 1B is smaller than the diameter D10 of the circular opening 10 of FIG. 1A formed by the first hole saw 61 (FIG. 8(a)).

Then, as shown in FIG. 9(b), the operation valve V is closed, and the slider 7, the operation case 8, the boring machine 83, etc., are removed.

After the removal, as shown in FIG. 10 or FIG. 13, an operation tank 92 is stacked on the operation valve V. In this process, the operation tank 92 is stacked on the operation valve V with the valve rod 21, the valve element 22 and the inner lid 3 of the butterfly valve 2 accommodated in the operation tank 92.

Figure 14B:
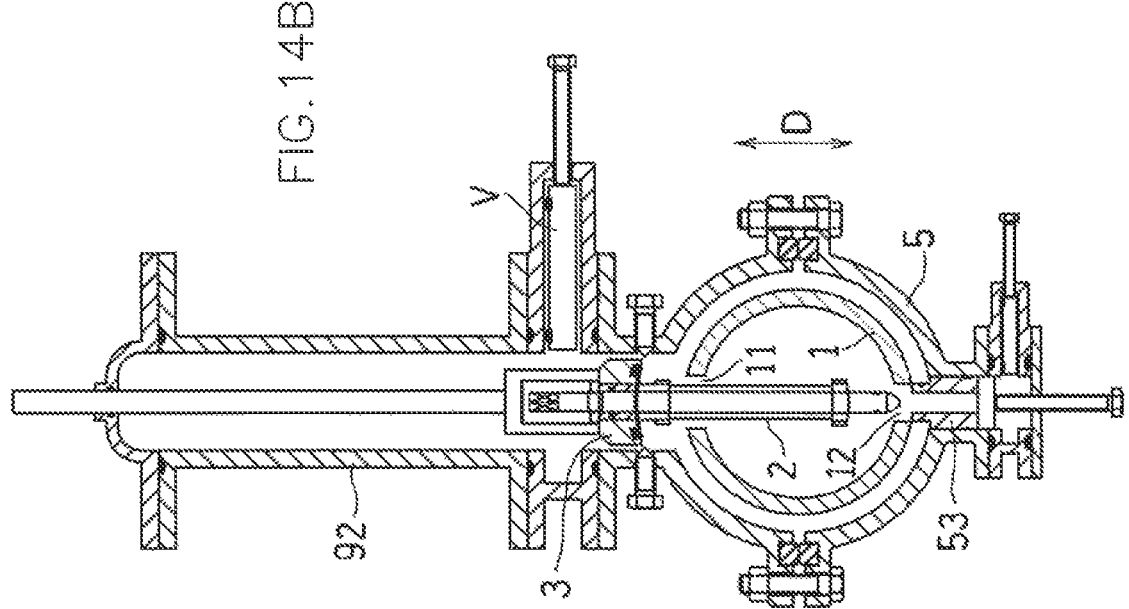
FIG. 14A and FIG. 14B are a schematic vertical-sectional view and a cross-sectional view, respectively, showing a state during the insertion of the butterfly valve according to Embodiment 1.
Figure 14A:
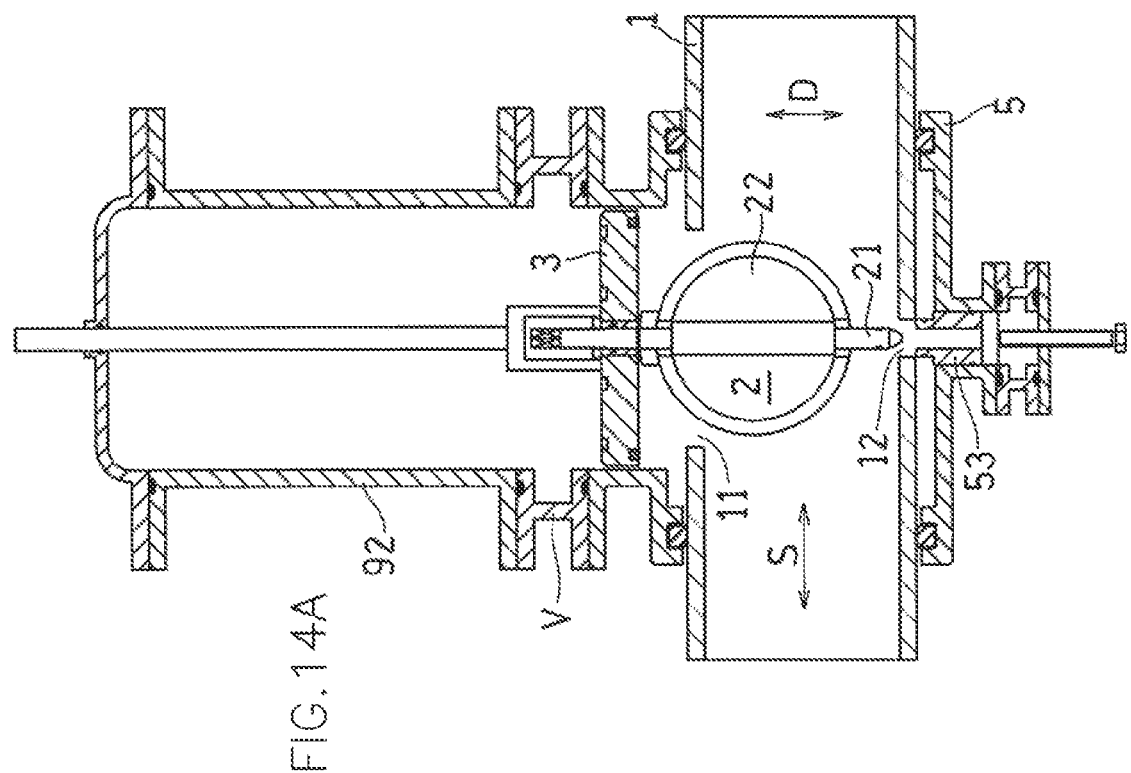

Then, the operation valve V of FIG. 14A and FIG. 14B is opened, and an insertion step is performed.

Figure 15A:
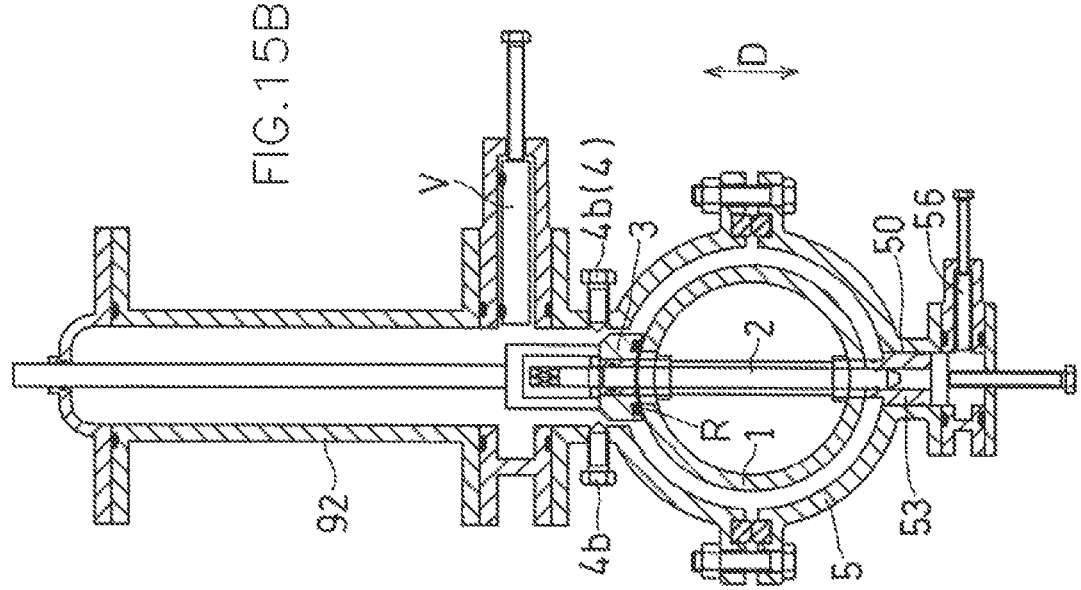
FIG. 15A and FIG. 15B are a schematic vertical-sectional view and a cross-sectional view, respectively, showing a state immediately before the completion of insertion of the butterfly valve according to Embodiment 1.
Figure 15B:
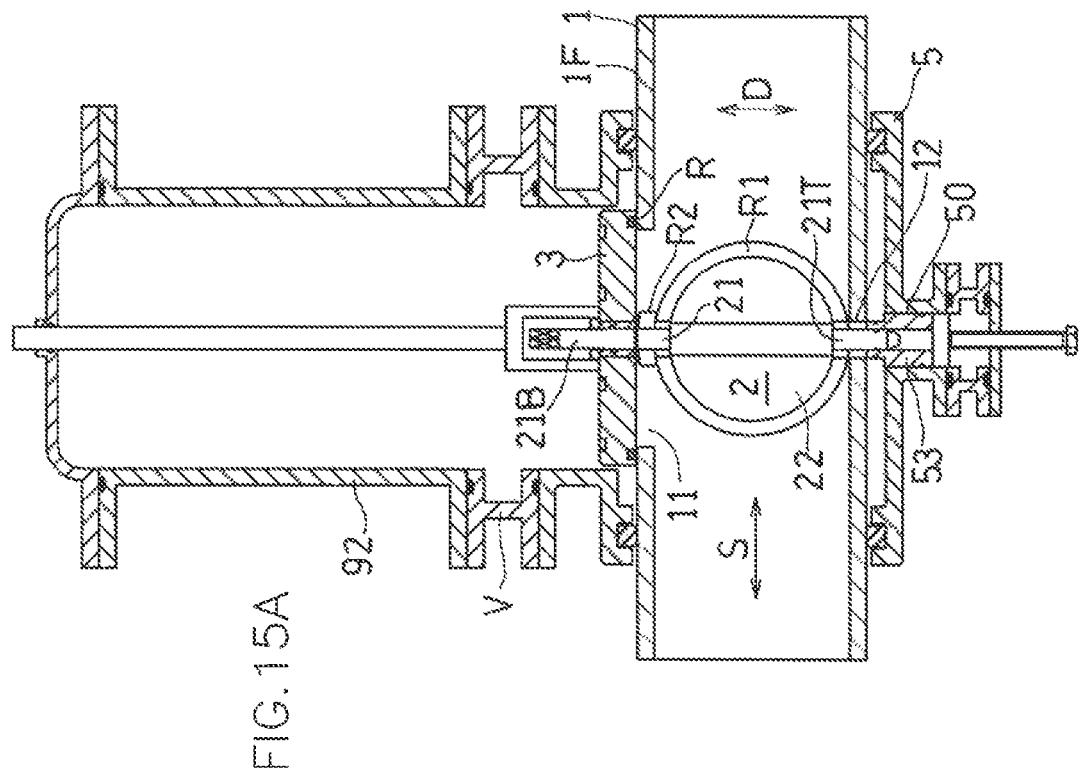
Figure 18B:
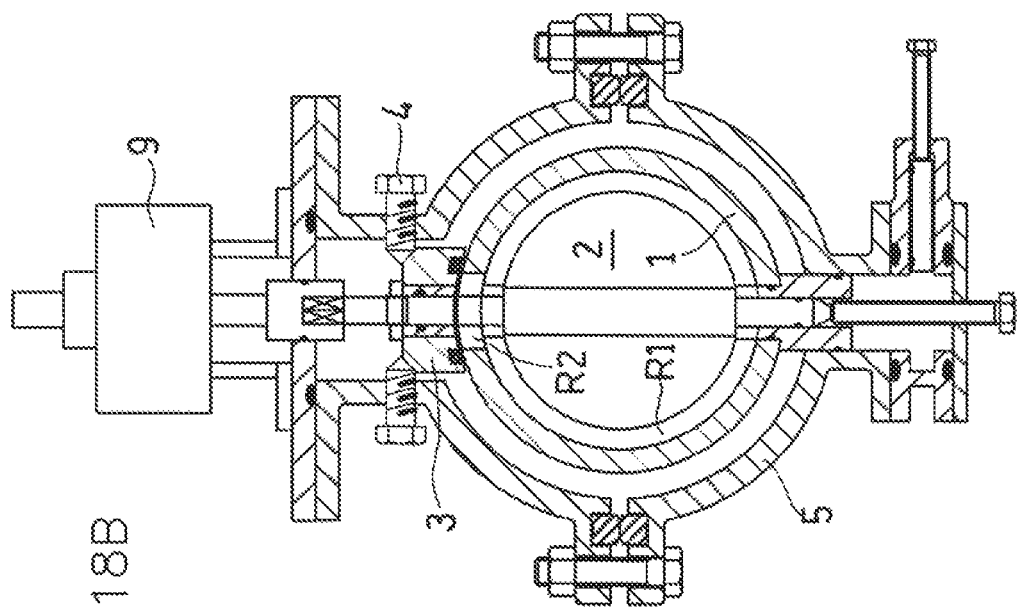
FIG. 18A and FIG. 18B are a schematic vertical-sectional view and a cross-sectional view, respectively, showing a state where the butterfly valve according to Embodiment 1 is closed.
Figure 18A:
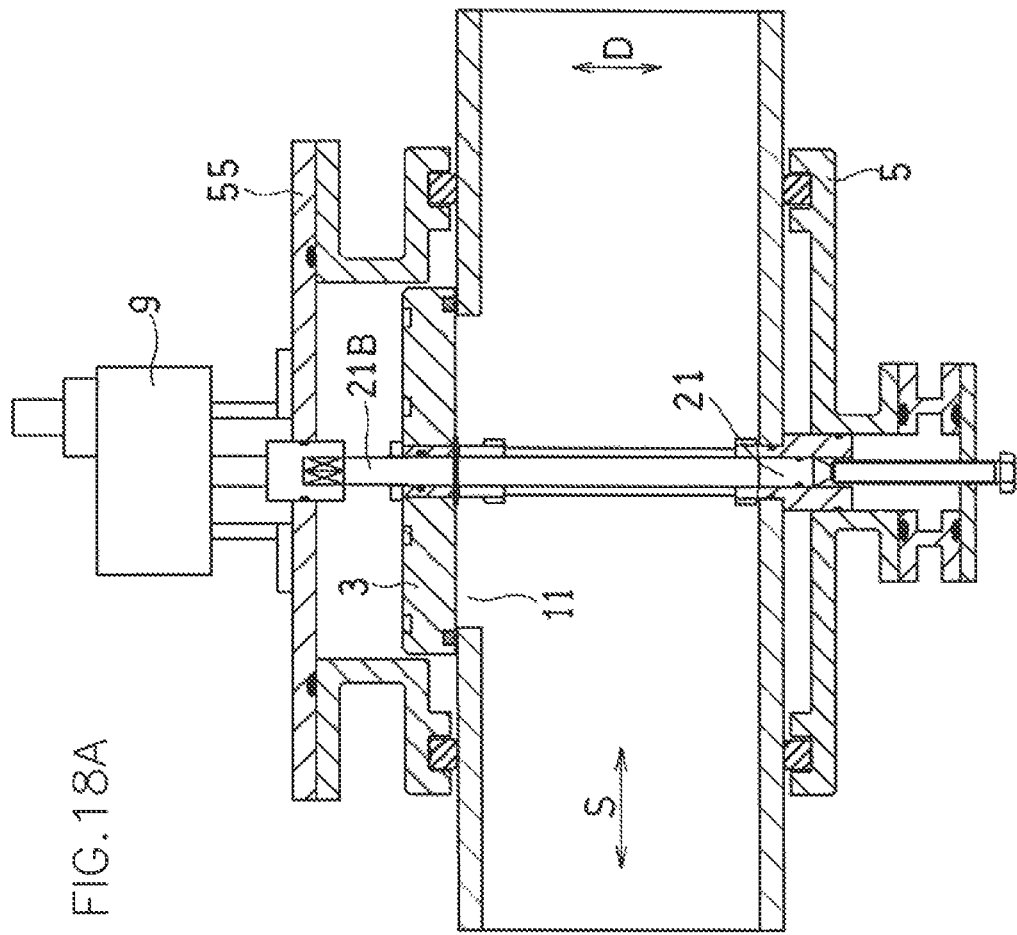

That is, FIG. 3A, FIG. 14A and FIG. 15A shows an insertion step: the butterfly-shaped valve element 22 is inserted, in the valve-open state, into the existing pipe 1 through the first opening 11. The valve element 22 is integral with the valve rod 21 that runs through the first and second openings 11, 12. This step is performed until the lower end portion 21T of the valve rod 21 protrudes from the second opening 12.

Figure 11:
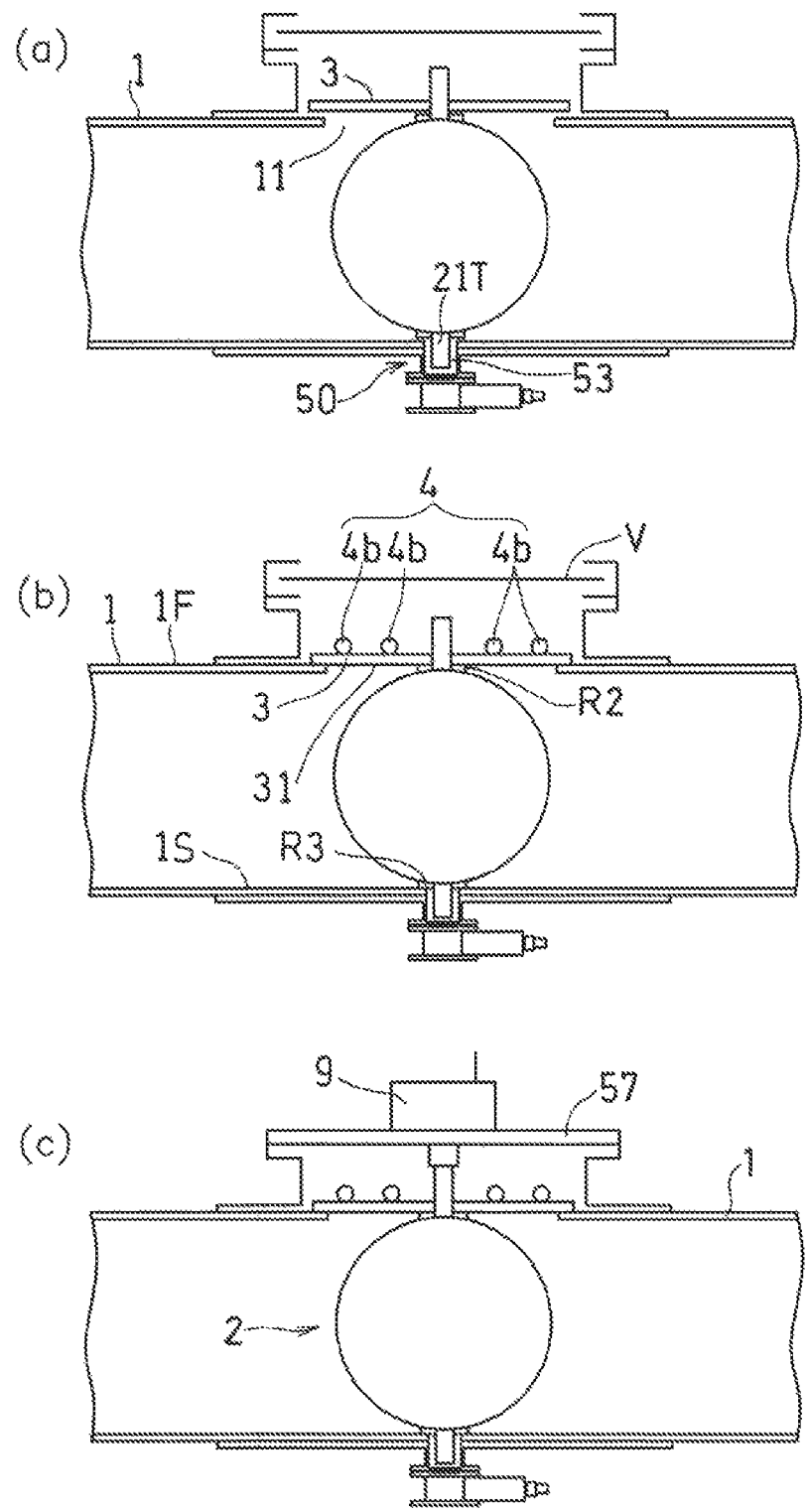
FIG. 11 is a schematic cross-sectional view showing, in a see-through manner, a step in the process according to Embodiment 1 of the present invention.

Next, a collar attachment step of FIG. 11(a) and a sealing step of FIG. 11(b) are performed.

That is, a collar attachment step of attaching the collar 53 to the outer circumference of the lower end portion 21T of the valve rod 21 that has been brought into the bearing portion 50 of the sealed case 5 in the insertion step of FIG. 15A is performed.

The sealing step is performed after the collar attachment step. That is, a sealing step of pressing the inner lid 3 that shuts the first opening 11 by means of the press tool 4 of FIG. 5A, thereby compressing the loop-shaped lid rubber R (FIG. 5B) that seals between the inner lid 3 and the existing pipe 1 is performed.

Then, the pressing bolts 4b of the press tool 4 of FIG. 11(b) and FIG. 16B are further screwed, thereby pressing the inner lid 3 against the outer circumferential surface 1F of the existing pipe 1. Thus, the upper rubber R2 is pressed against the inner surface 31 of the inner lid 3, and the rubber ring R3 is pressed against the inner circumferential surface 18S of the existing pipe 1.

Then, the operation valve V of FIG. 11(b) is removed, and the lid plate 57 and the decelerator 9 of FIG. 11(c) are removed. Thus, the installment of the butterfly valve 2 into the existing pipe 1 is complete.

The butterfly valve 2 is rotated to be closed, as necessary, as shown in FIG. 6A, FIG. 6B, FIG. 18A and FIG. 18B. This blocks the water through the pipeline.

Next, a method for estimating the inner diameter of the existing pipe 1 will be described.

First, in the state of FIG. 7(b), the outer diameter D4 of the existing pipe 1 is measured from the gap between the sealed case 5 and the existing pipe 1. Then, the thicknesses T1, T2 of the first and second cut pieces S1, S2 of FIG. 1A are measured. Then, the inner diameter D3 of the existing pipe 1 is calculated by subtracting the thicknesses T1, T2 of the first and second cut pieces S1, S2 from the measured outer diameter D4.

Next, the details of the system for sliding the cutting tool 60 of FIG. 12A and FIG. 12B will be described. The present system includes the operation valve V, the slider 7, the operation case 8, the mover 70 of FIG. 8(b), etc.

The slider 7 of FIG. 12A is arranged on the opposite side of the operation valve V with respect to the first protruding pipe portion 51 and is movable along the pipe axis direction S of the existing pipe 1.

The operation case 8 is connected on the opposite side of the operation valve V with respect to the first protruding pipe portion 51 and slidably supports the slider 7. The airtight chamber 80 of the operation case 8 applies, on the second surface 72 of the slider 7 on the opposite side from the first surface 71, a pressure that resists the internal pressure in the existing pipe 1 that is applied on the first surface 71 of the slider 7.

The mover 70 of FIG. 8(b) is for moving the slider 7 relative to the operation case 8 along the pipe axis direction S, and may be of a pantograph type, for example.

The cutting tool 60 of FIG. 12A is connected to the slider 7 and is protruding toward the existing pipe 1, wherein the cutting tool 60 forms, in the existing pipe 1, the first opening 11 of a groove shape elongated along the pipe axis direction S as the slider 7 moves.

Next, a method for moving the cutting tool 60 in the pipe axis direction S will be described.

A moving step of moving the slider 7 of FIG. 12A in the pipe axis direction S by means of the mover 70 (FIG. 8(b)), thereby moving the cutting tool 60 in the pipe axis direction S is performed. In this process, a pressure fluid in the existing pipe 1 is introduced in advance into the airtight chamber 80 from the second protruding pipe portion 52 of FIG. 12A, thereby applying a pressure on the second surface 72 of the slider 7. The application of the pressure may be done by a hand-operated hydraulic pump.

Figure 19A:
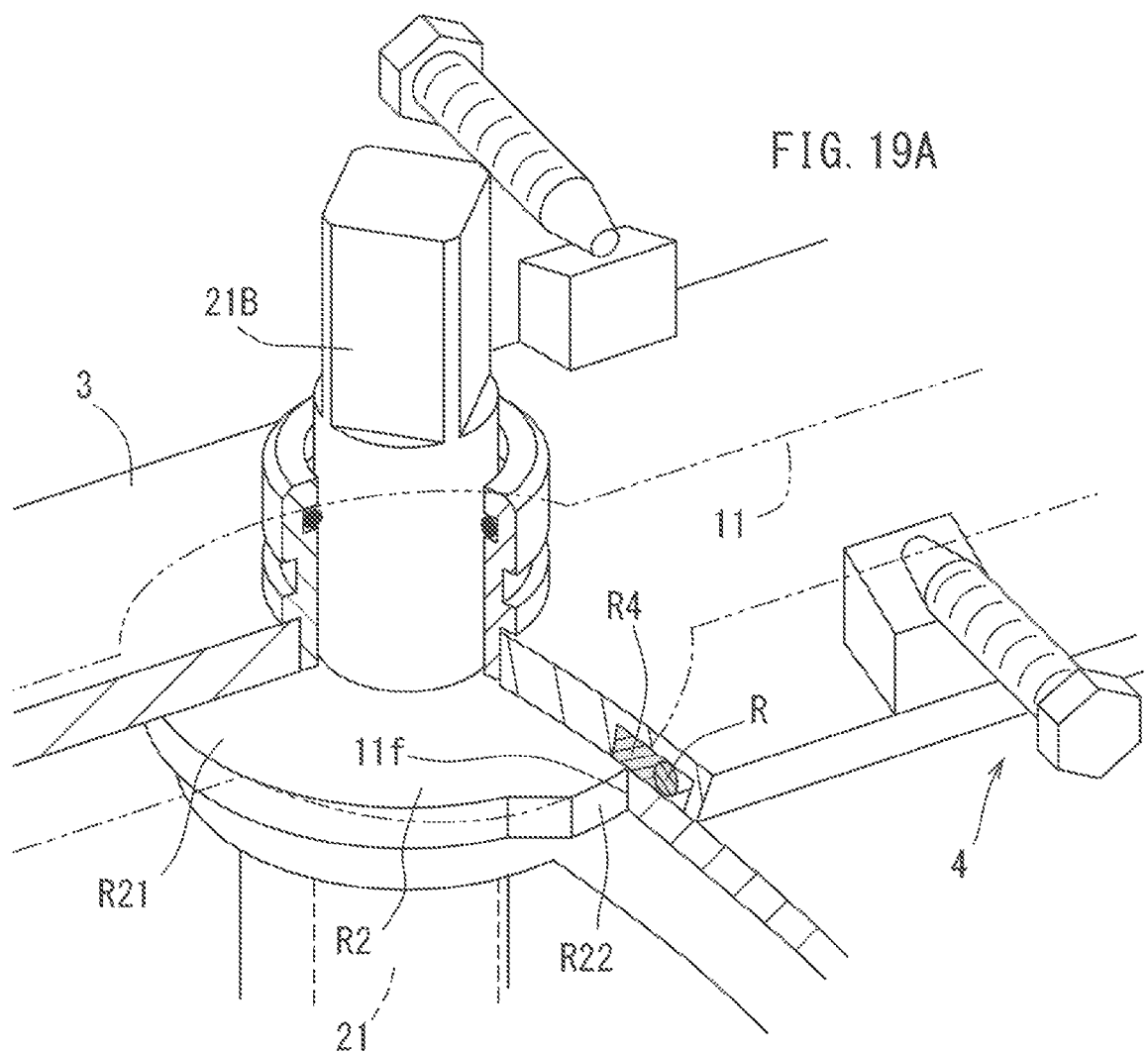
FIG. 19A is a schematic perspective view showing, in the valve-closed state, a part of the butterfly valve according to Embodiment 2.
Figure 19B:
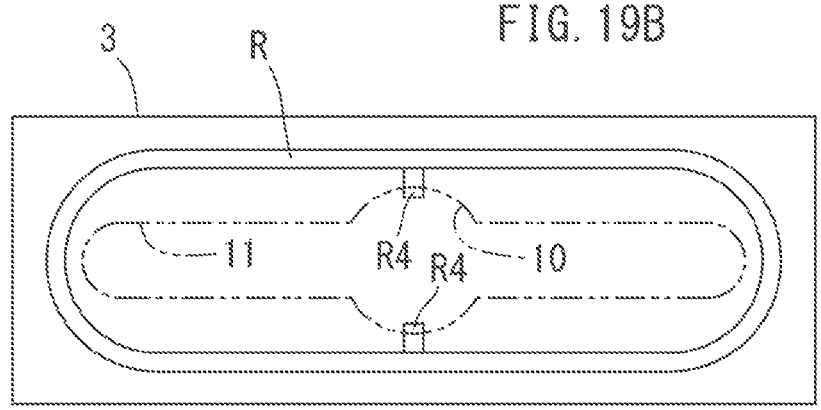
FIG. 19B is a bottom view showing the inner lid.

FIG. 19A and FIG. 19B show Embodiment 2.

In Embodiment 2, the lid rubber R includes the auxiliary seal portions R4. The auxiliary seal portions R4 contact the large-diameter portions R22 in the valve-closed state.

The large-diameter portions R22 are preferably a rubber that uses hydrogen peroxide as a vulcanizing agent, as opposed to the vulcanized rubber of the lid rubber R and the upper rubber R2. This is to prevent the rubbers from adhering together.

FIG. 20 to FIG. 22B show Embodiment 3.

With the present embodiment, the press tool 4 includes a plurality of first pressing bolts 4b and a plurality of second pressing bolts 4c.

The sealed case 5 includes the first protruding pipe portion 51 that covers the inner lid 3 from four directions, and the outer lid 55 that is connected to the first protruding pipe portion 51 to cover the inner lid 3.

As shown in FIG. 22A, the first pressing bolts 4b are supported on the pipe wall of the first protruding pipe portion 51 and are moved forward and backward along the tangential direction to the existing pipe 1 so as to press the inner lid 3 against the outer circumferential surface of the existing pipe 1. Note that the first pressing bolts 4b may be configured to be in contact with seat portions 4d having tapered surfaces on the upper surface of the inner lid 3, as shown in FIG. 4B and FIG. 5B.

As shown in FIG. 22B, the second pressing bolts 4 are supported on the pipe wall of the outer lid 55 and are moved forward and backward along the radial direction of the existing pipe 1 so as to press the inner lid 3 against the outer circumferential surface 1F of the existing pipe 1.

FIG. 23A to FIG. 31 show Embodiment 4.

The piping structure and the process of Embodiment 4 will be described primarily for the structure and the process that are different from those of Embodiment 1 or Embodiment 2 described above.

Figure 23A:
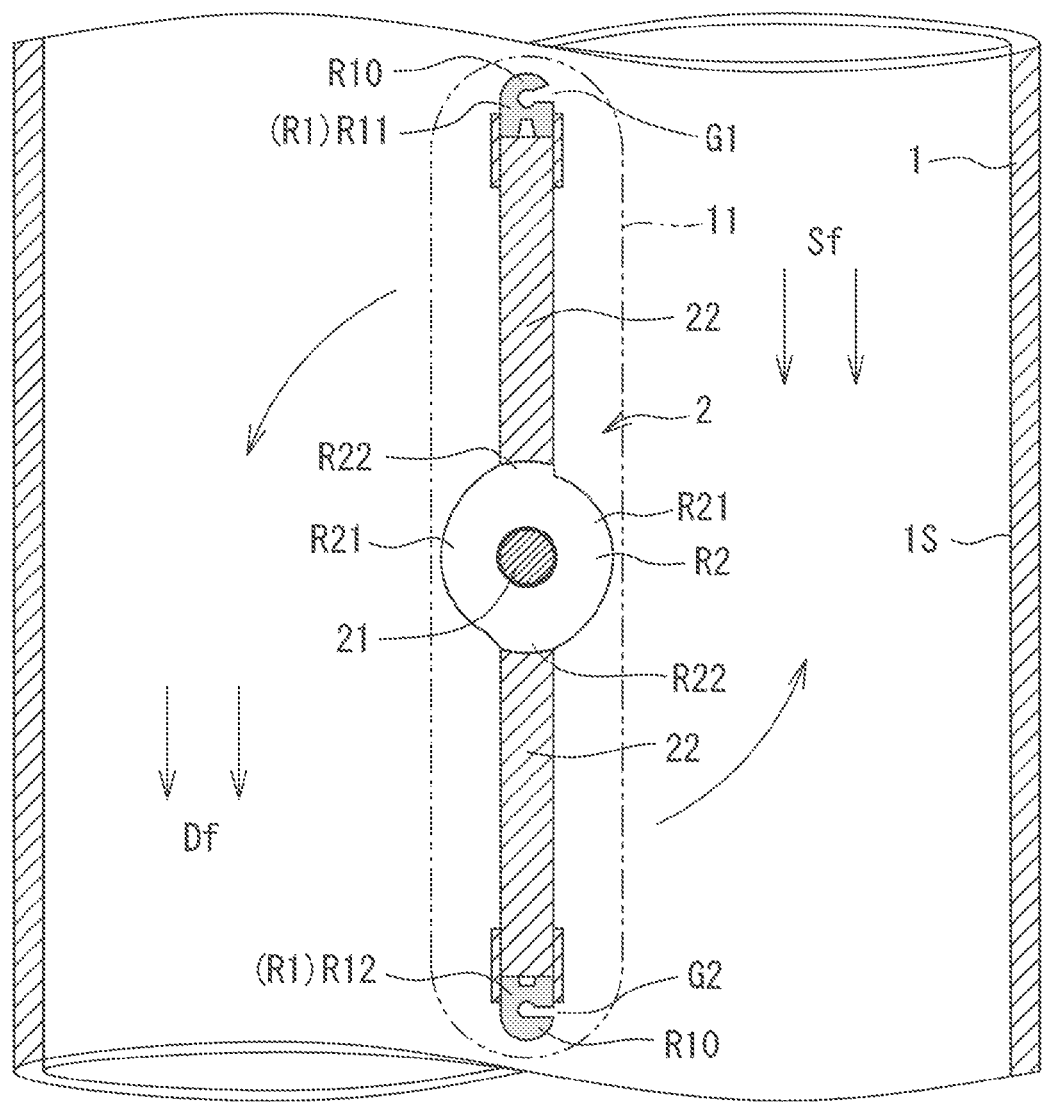
FIG. 23A and FIG. 23B are partially-cross-sectional plan views showing the piping structure of Embodiment 4.

FIG. 23A to FIG. 25 show the structure of the outer circumferential rubber R1 of Embodiment 4. As shown in FIG. 23A and FIG. 23B, in the valve-closed state of the valve element 22, the space inside the existing pipe 1 is divided by the valve element 22 into the upstream side Sf where the fluid pressure acts in the existing pipe 1 and the downstream side Df where the fluid pressure in the existing pipe 1 is depressurized.

Figure 23B:
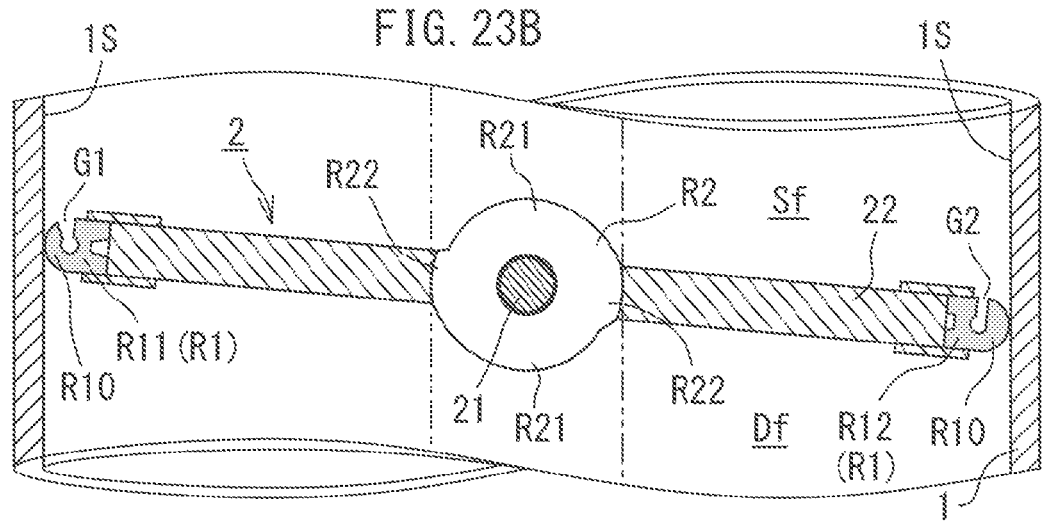

The self-seal groove G1, G2 is formed on the upstream side Sf of the outer circumferential rubber R1, wherein in the valve-closed state of FIG. 23B, the self-seal groove G1, G2 receives the fluid pressure to press the outer circumference end portion R10 of the outer circumferential rubber R1 against the inner circumferential surface 1S of the existing pipe 1.

Figure 24:
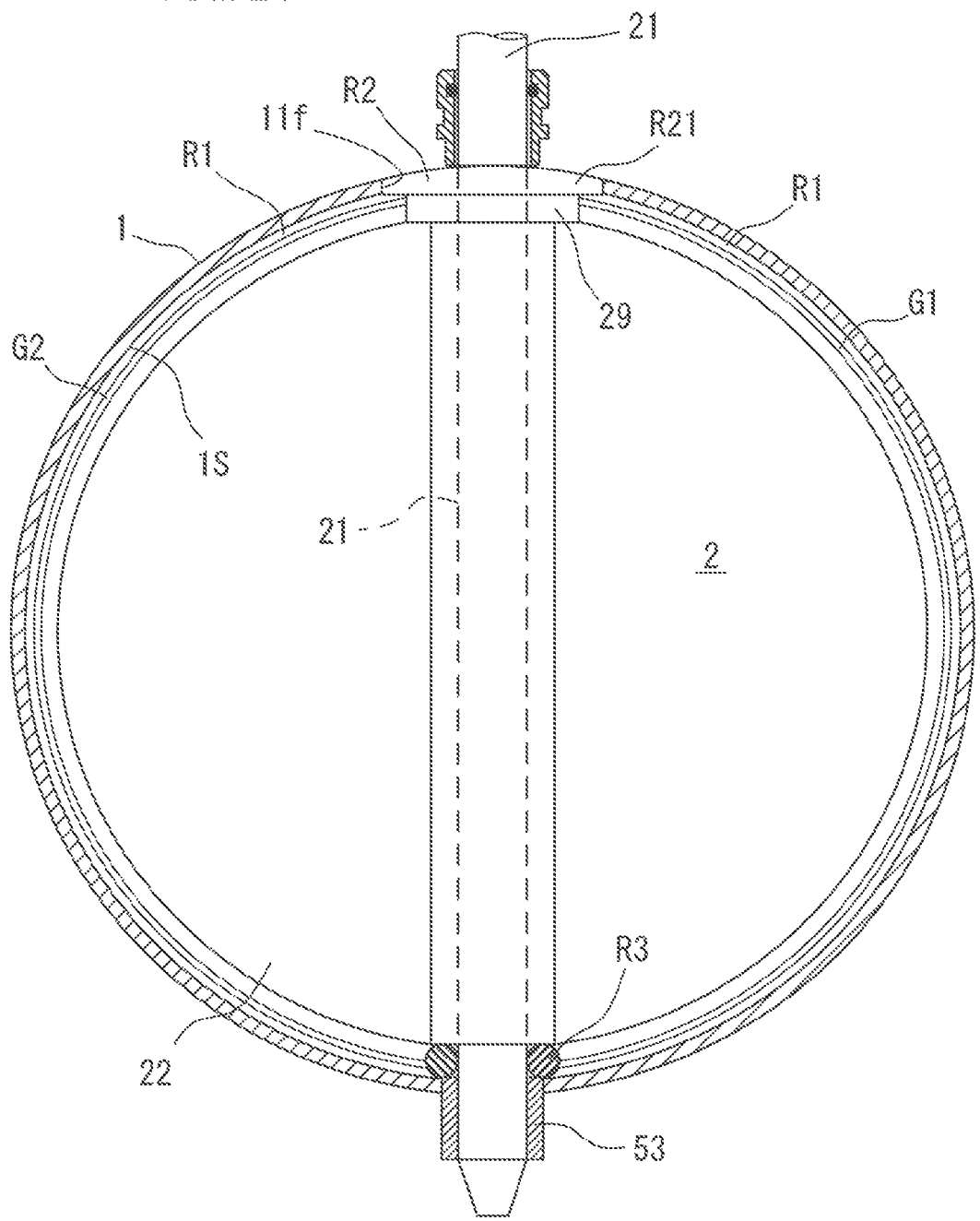
FIG. 24 is a front view showing the same.

In FIG. 24, the outer circumferential rubber R1 includes the first half-ring rubber R11 and the second half-ring rubber R12. The self-seal groove G1, G2 of each half-ring rubber R12 is formed elongated along the circumferential direction in which the half-ring rubber R12 extends.

As shown in FIG. 23A and FIG. 23B, the first half-ring rubber R11 is attached to an area of the valve element 22 that rotates from the upstream side Sf toward the downstream side Df when the valve element 22 is closed.

The second half-ring rubber R12 (FIG. 24) is attached to an area of the valve element 22 that rotates from the downstream side Df toward the upstream side Sf when the valve element 22 is closed.

In FIG. 23B, the outer circumference end portion R10 of the second half-ring rubber R12 has a higher rigidity than the outer circumference end portion R10 of the first half-ring rubber R11.

Figure 25:
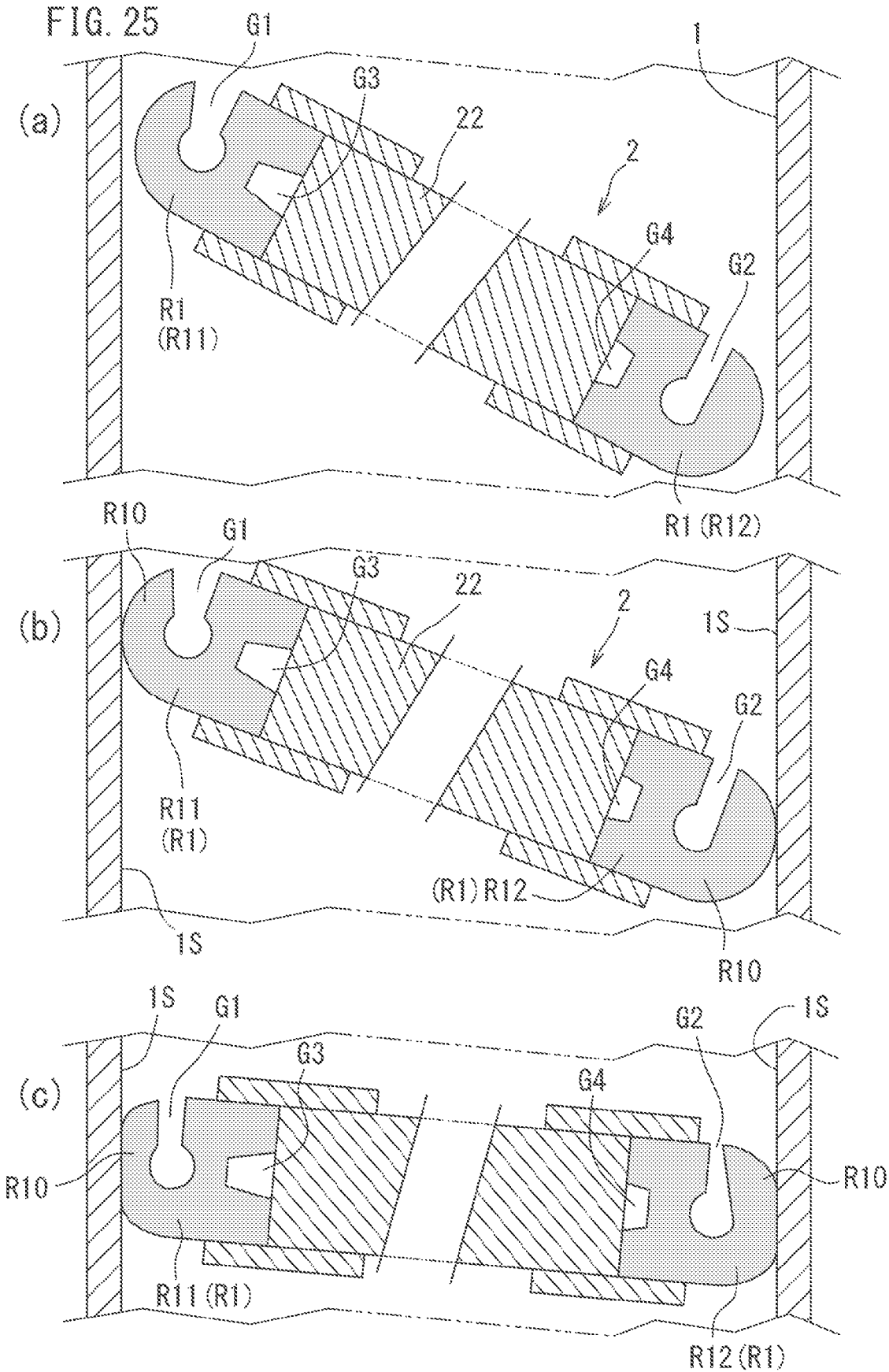
FIG. 25 is a cross-sectional view showing an example of the outer circumferential rubber.

For example, as shown in FIG. 25, the outer circumference end portion R10 of the second half-ring rubber R12 is formed thicker, in the cross section of the outer circumferential rubber R1, than the outer circumference end portion R10 of the first half-ring rubber R11. That is, the self-seal groove G1 of the first half-ring rubber R11 is formed larger and at a position closer to the outer circumferential edge of the outer circumferential rubber R1 than the self-seal groove G2 of the second half-ring rubber R12.

As shown in FIG. 25, a relief groove G3, G4 is formed along the outer circumference of the valve element 22 on the inner circumference side of the half-ring rubber R11, R12. On the cross section of the outer circumferential rubber R1, the relief groove G3 of the first half-ring rubber R11 is larger than the relief groove G4 of the second half-ring rubber R12.

Note that the half-ring rubber R11, R12 of FIG. 24 is shorter than half the length of the arc of the outer circumference of the butterfly valve 2.

The first and second half-ring rubbers R11, R12 each have a uniform cross section and is formed by extrusion molding, for example. Note that where the existing pipe 1 is a steel pipe with weld beads, a rubber having a lower hardness may be arranged in a portion to be in contact with the weld beads.

Next, the deformation of the upper rubber R2 when the butterfly valve 2 of FIG. 25 is closed will be described.

As shown in FIG. 23A. FIGS. 25(a) and 25(b), when the butterfly valve 2 is rotated in the valve-closing direction from the position where the butterfly valve 2 is fully open, the outer circumference end portion R10 of the outer circumferential rubber R1 eventually contacts the inner circumferential surface 1S of the existing pipe 1. After the contact, when the butterfly valve 2 is further rotated in the valve-closing direction, the outer circumference end portion R10 deforms by being pressed against the inner circumferential surface 1S of the existing pipe 1 as shown in FIG. 25(c).

During the deformation while closing the valve, a frictional resistance occurs between the outer circumference end portion R10 and the inner circumferential surface 1S of the existing pipe 1, thereby creating a force such that the outer circumference end portion R10 of the second half-ring rubber R12 flips and deforms.

In contrast, with the present embodiment, the outer circumference end portion R10 of the second half-ring rubber R12 has a higher rigidity than the outer circumference end portion R10 of the first half-ring rubber R1, and can therefore prevent such a deformation of the outer circumference end portion R10 of the second half-ring rubber R12 that the outer circumference end portion R10 flips. Therefore, the reliability of the sealing capacity of the butterfly valve 2 is high.

On the other hand, where the rigidity of the outer circumference end portion R10 is too high, the rotation torque of the butterfly valve 2 is high when closing the butterfly valve 2. In contrast, with the present embodiment, the outer circumference end portion R10 of the first half-ring rubber R11 has a lower rigidity than the outer circumference end portion R10 of the second half-ring rubber R12.

Therefore, it is possible to prevent the rotation torque when closing the valve from being too high.

Next, the details of the lid rubber R and the upper rubber R2 of FIG. 27 will be described using the present embodiment.

Figure 27:
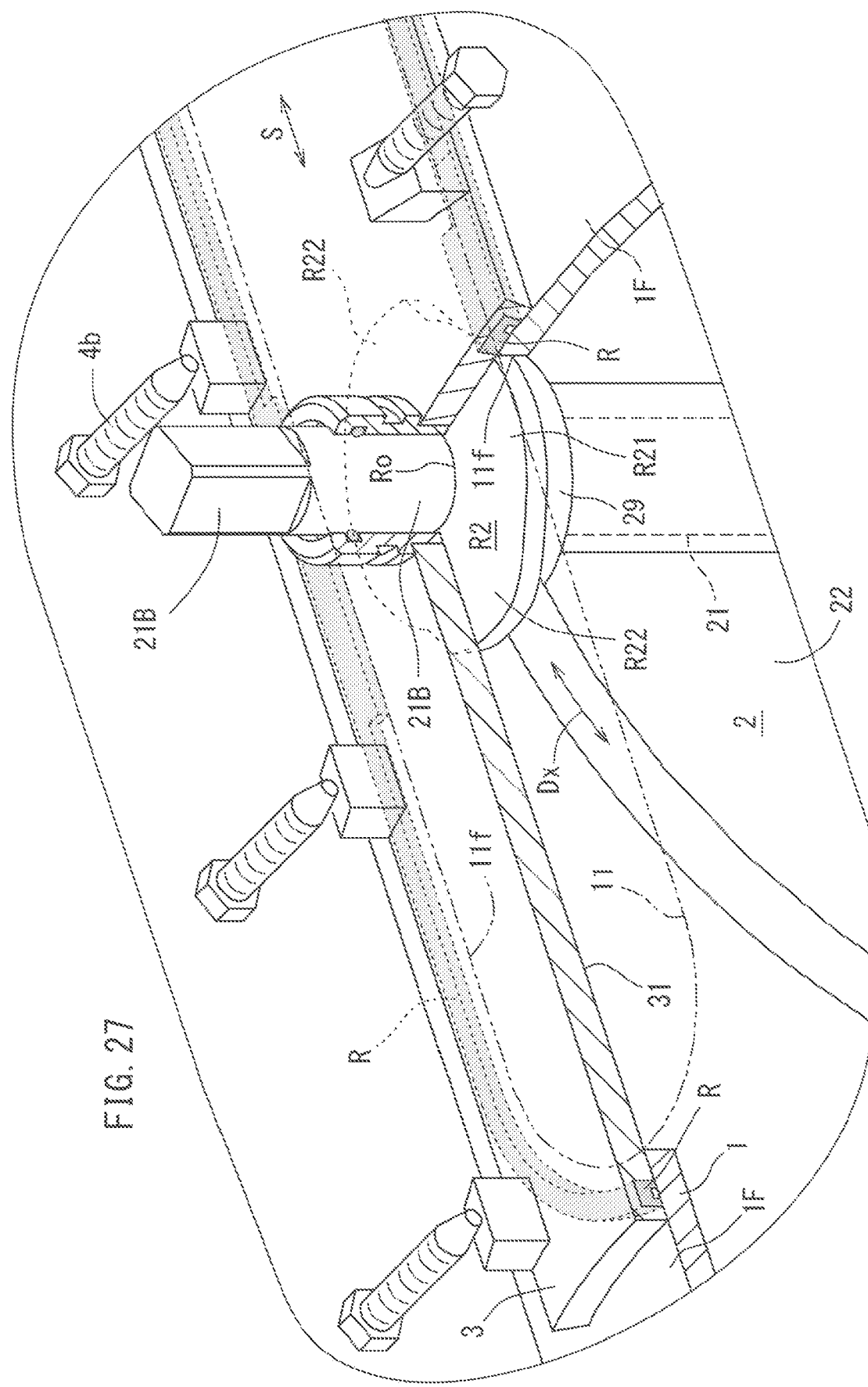
FIG. 27 is a schematic perspective view showing the piping structure in the valve-open state.
Figure 28A:
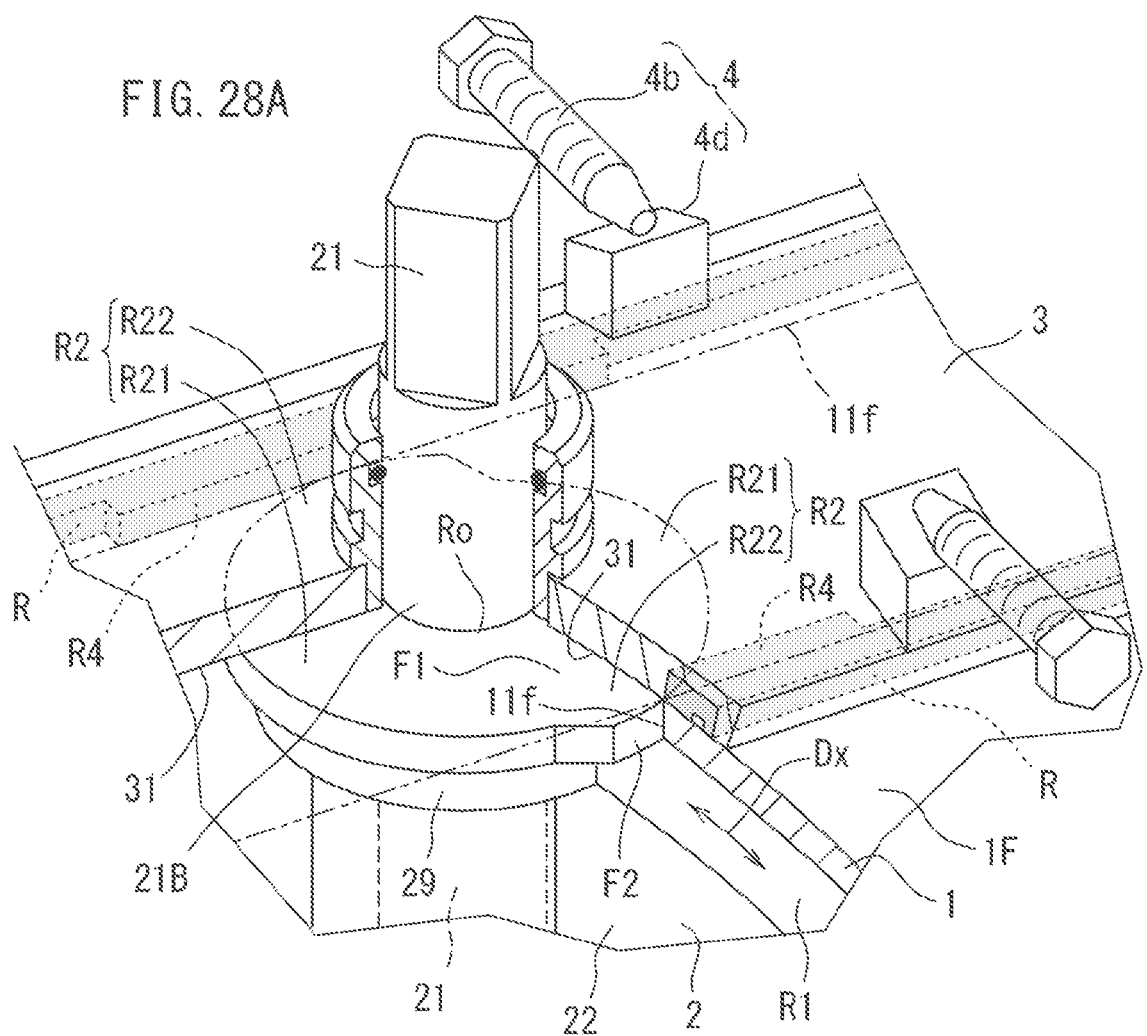
FIG. 28A is a schematic perspective view showing, in the valve-closed state, a part of the butterfly valve according to Embodiment 4.
Figure 28B:
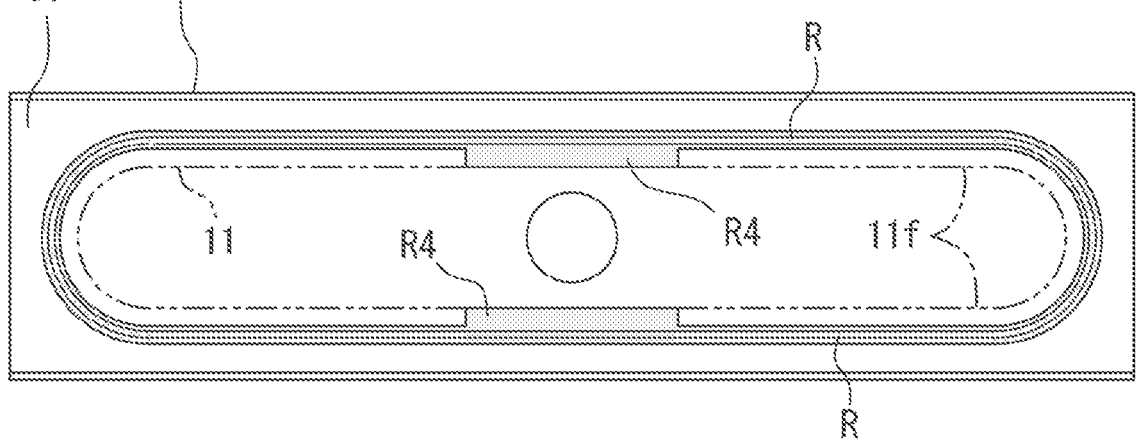
FIG. 28B is a bottom view showing the inner lid.

As shown in FIG. 27 to FIG. 28B, the lid rubber R is formed in a loop shape. Thus, the lid rubber R of FIG. 27 seals between the inner lid 3 and the outer circumferential surface 1F of the existing pipe 1. Note that the lid rubber R may be fitted into a groove formed on the inner lid 3 with no adhesive. The lid rubber R may have a groove that extends over the entire circumference of the lid rubber R.

As shown in FIG. 29A to FIG. 31, the lid rubber R may integrally include the auxiliary seal portion R4. In the present embodiment, the auxiliary seal portion R4 may have a straight bar shape extending along the end face 11f of the first opening 11 and formed integral with the lid rubber R.

Figure 29A:
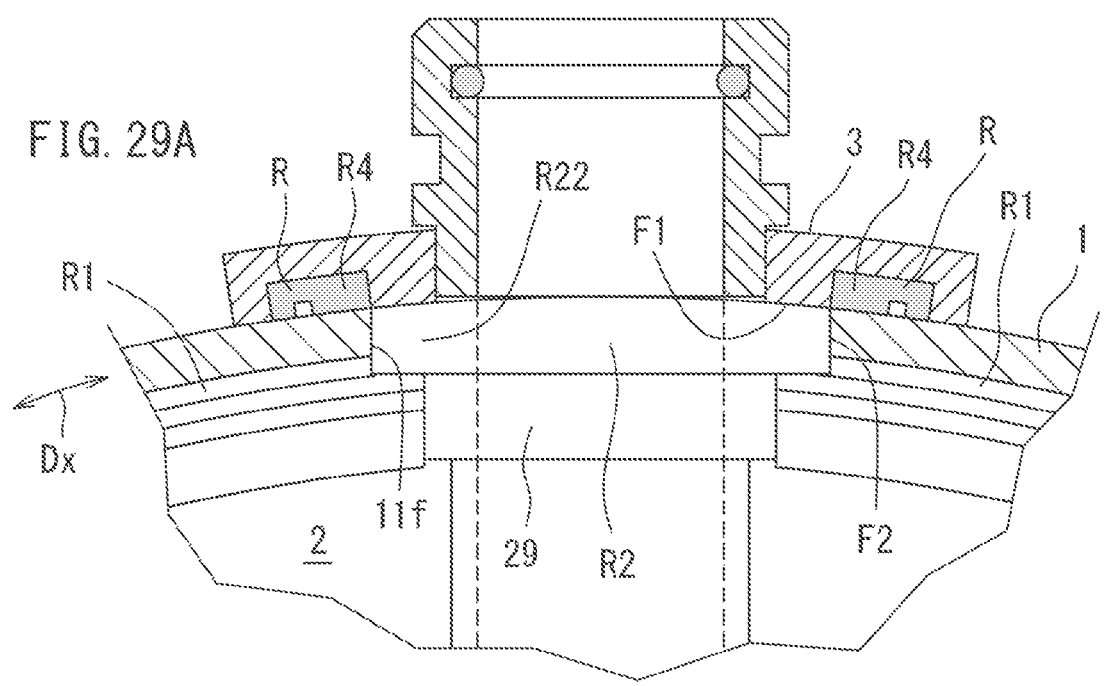
FIG. 29A is a front view showing the seal structure of the upper portion of the butterfly valve.
Figure 29B:
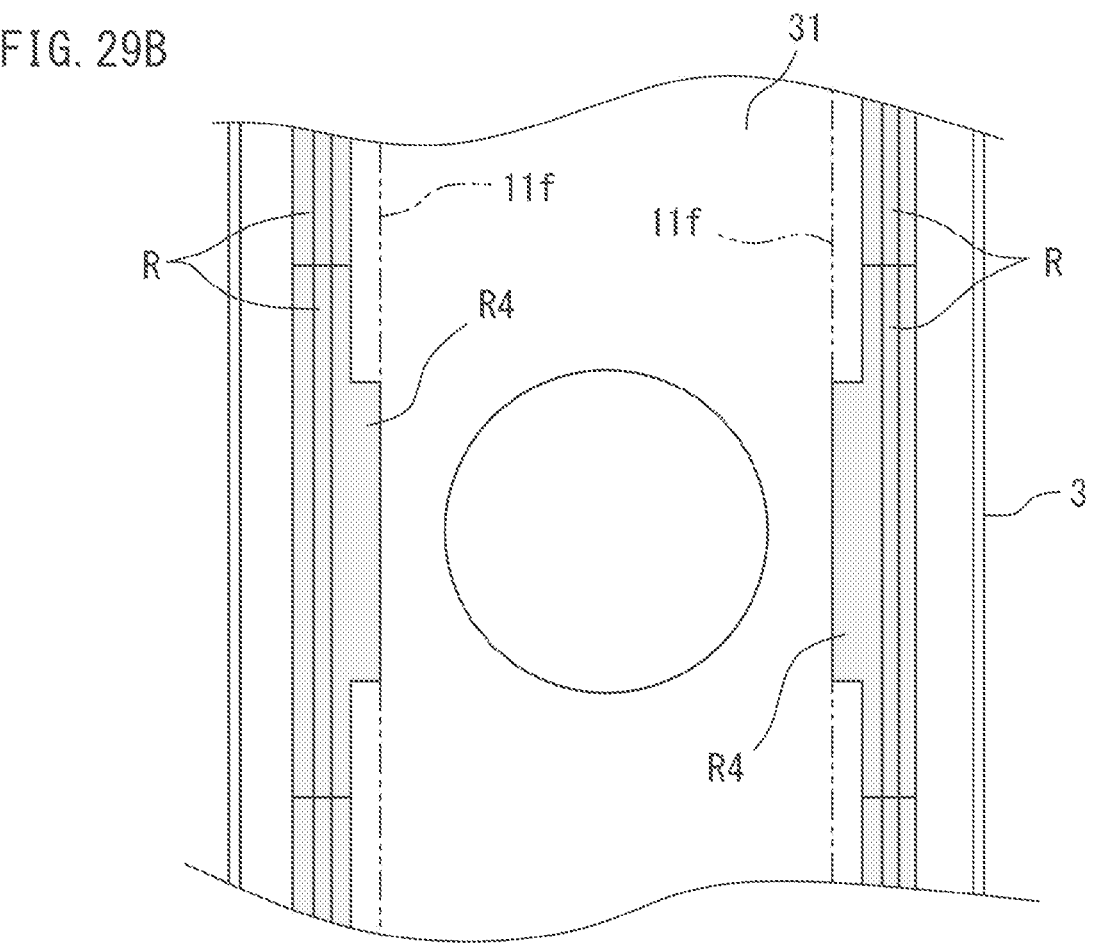
FIG. 29B is a bottom view showing a part of the inner lid.
Figure 30:
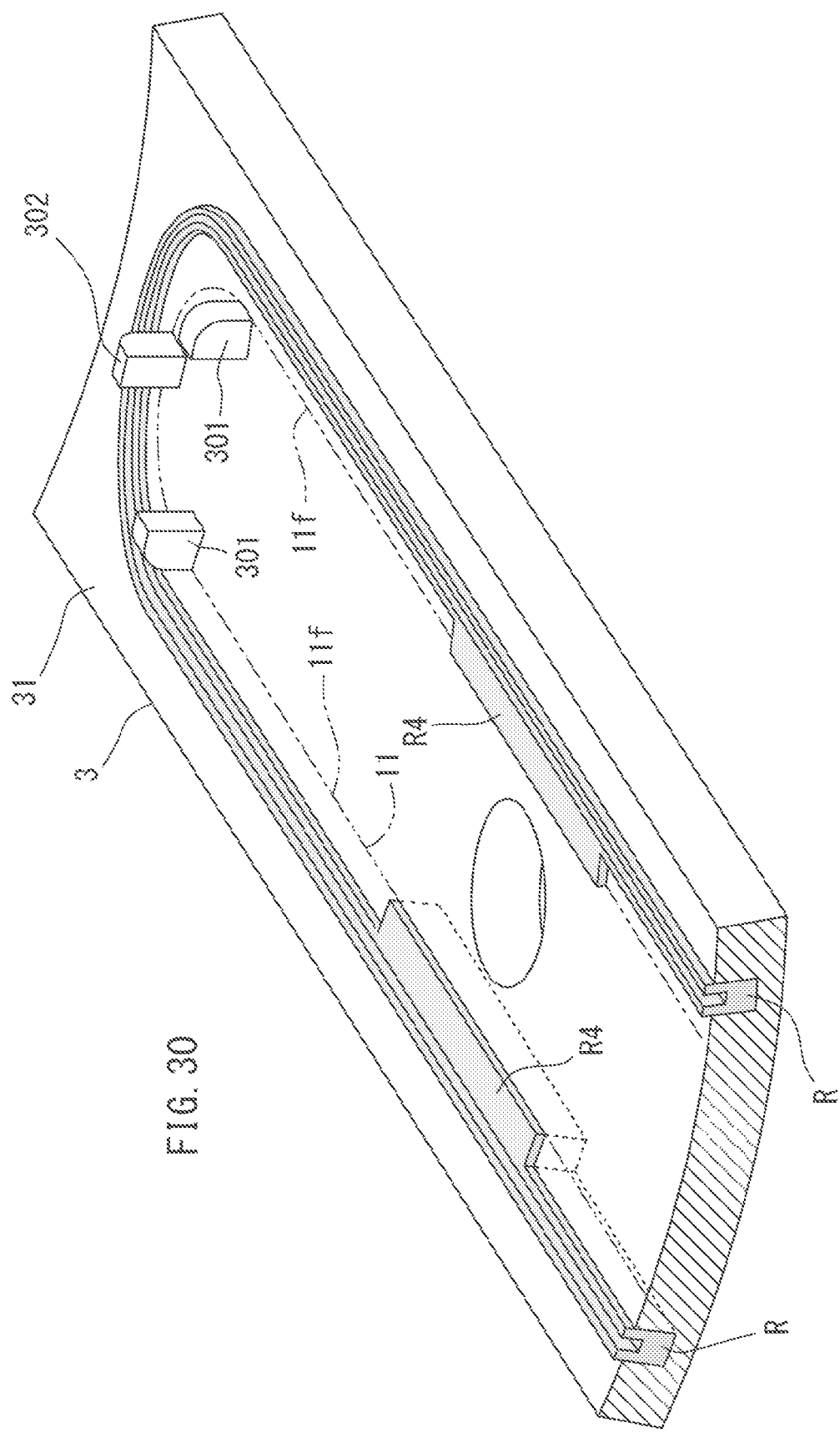
FIG. 30 is a schematic perspective view showing the inner lid.
Figure 31:
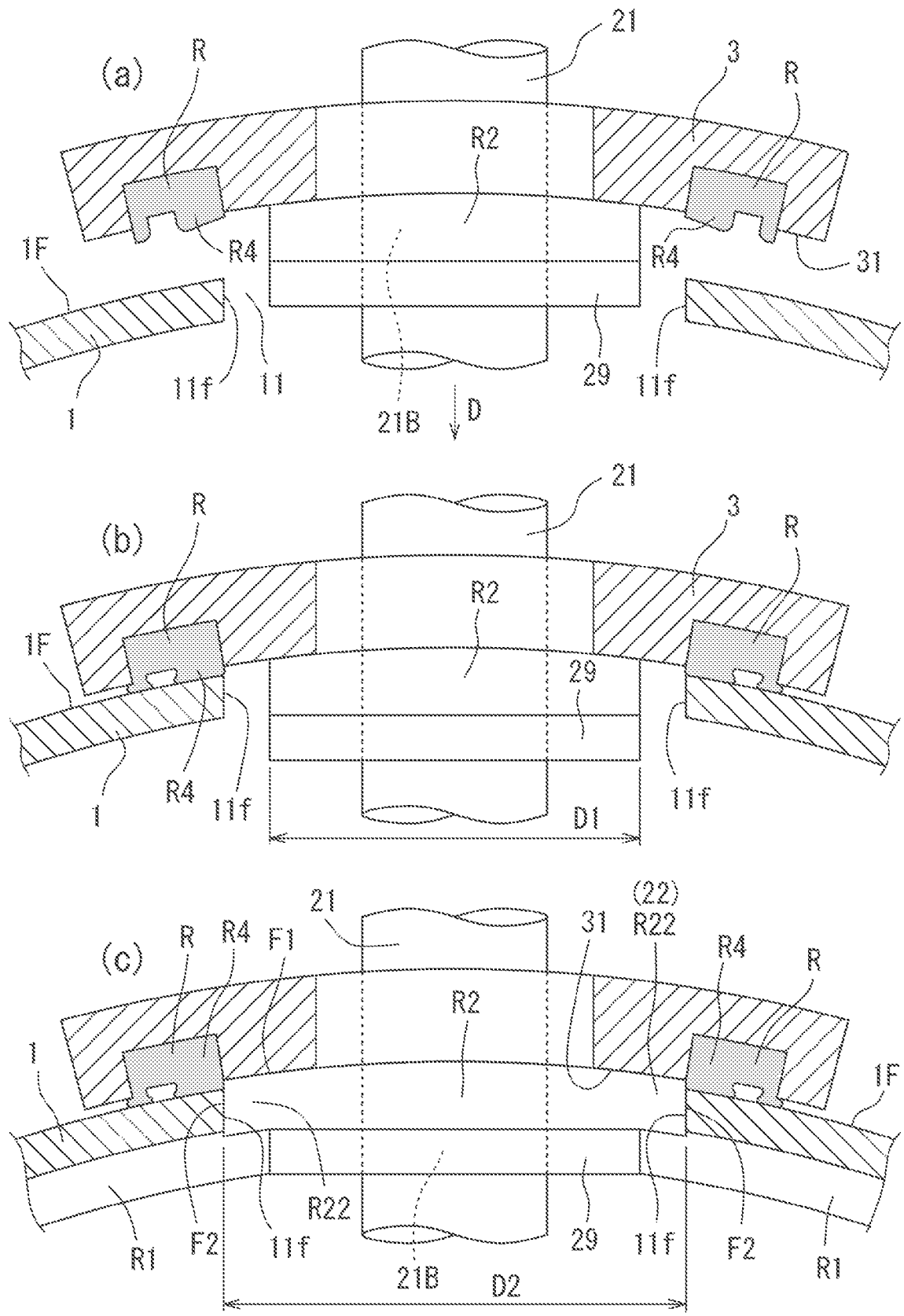
FIG. 31 is a cross-sectional view showing the seal structure of the upper portion.

Note that as shown in FIG. 29B, the lid rubber R may include a molded portion and an extruded portion that are connected together after being formed.

As shown in FIG. 28A, the upper rubber R2 is formed in a loop shape and a disc shape that define the through hole Ro through which the valve rod 21 runs. The upper rubber R2 includes two large-diameter portions R22 and two small-diameter portions R21, which have the first diameter D1 (FIG. 31) smaller than the second diameter D2 (FIG. 31) of the two large-diameter portions R22. The large-diameter portion and the small-diameter portion continuously alternate with each other in the circumferential direction of the upper rubber R2.

The lower surface of the upper rubber R2 may be supported by being bonded to a circular base 29. Note that the tip portion of each large-diameter portion R22 of the upper rubber R2 may protrude from the base 29.

In FIG. 28A, the upper rubber R2 is rotated together with the valve rod 21. The upper rubber R2 includes a pair of seal portions R22.

With the present embodiment, the pair of seal portions R22 are formed as the large-diameter portions R22 that each protrude along the direction Dx in which the outer circumferential rubber R1 extends. Each large-diameter portion R22 has the top surface F1 that is in contact with the inner surface 31 of the inner lid. 3 in the valve-closed state and the tip end face F2 that is in contact with the corresponding end face 11f in the valve-closed state.

In the valve-open state where the valve element 22 of FIG. 27 is open, the pair of seal portions R22 are in a non-sealed state where the seal portions R22 are spaced apart from respective ones of the pair of end faces 11f that define the first opening 11 and are elongated in the pipe axis direction S so as not to seal between each end face 11f and the corresponding seal portion R22, whereas in the valve-closed state where the valve element 22 of FIG. 28A is closed, the seal portions R22 are in the sealed state so as to seal between the inner surface 31 of the inner lid 3 and the seal portions 122 and seal between each end face 11f and the corresponding seal portion R22.

Next, the details of the seal structure between the lid rubber R and the upper rubber R2 of the present embodiment will be described.

FIG. 31(a) shows a state immediately before the inner lid 3 descends downward D together with the valve rod 21 to shut the first opening 11 of the existing pipe 1 in the valve-open state (FIG. 27) (immediately before the completion of insertion of the butterfly valve). As shown in FIG. 31(a) to FIG. 31(b), when the inner lid 3 descends downward D together with the butterfly valve, the lid rubber R comes into contact with the outer circumferential surface 1F of the existing pipe 1, and the inner lid 3 is pressed from above by the press tool 4 described above, thereby compressing the lid rubber R between the existing pipe 1 and the inner lid 3 and sealing therebetween. At this point, the auxiliary seal portion R4 of the lid rubber JR seals between the existing pipe 1 and the inner lid 3.

Then, as necessary, the butterfly valve 2 is rotated slightly less than about 90° so as to transition from the valve-open state of FIG. 27 to the valve-closed state of FIG. 28A. With this rotation of the butterfly valve 2, the upper rubber R2 of FIG. 27 rotates together with the valve element 22 as shown in FIG. 28A, thereby bringing the butterfly valve 2 to the valve-closed state.

After the rotation of the upper rubber R2, the upper rubber R2 exhibits the sealing function as follows in the valve-closed state.

That is, as shown in FIG. 31(c), the top surface F1 of the seal portion R22 contacts the inner surface 31 of the inner lid 3, and the tip end face F2 of the seal portion R22 contacts the end face 11f of the first opening 11. Moreover, with the present embodiment, the seal portion R22 contacts the upper rubber R2 with the auxiliary seal portion R4 interposed therebetween. With these, it is possible to prevent water leakage from the upper end portion of the butterfly valve 2.

With the present embodiment, a precision for positioning the inner lid 3 relative to the first opening 11 of the existing pipe 1 of FIG. 31(a) is often required. In order to increase the precision, it is preferred to provide a pair of projections 301, 302 that engage with the end face 11f of the first opening 11 of FIG. 30.

Figure 32:
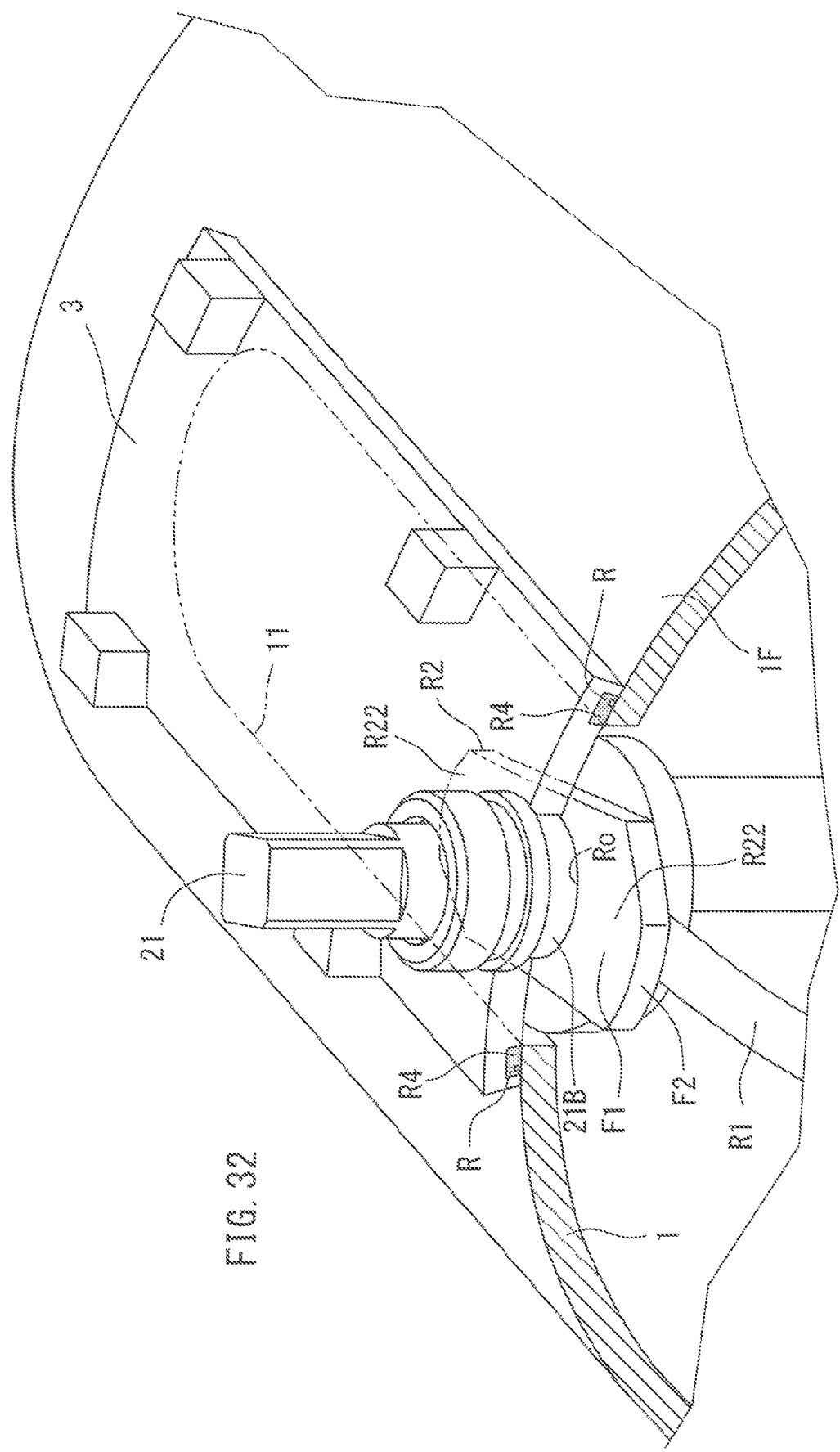
FIG. 32 is a schematic perspective view showing another example of the upper rubber.

FIG. 32 shows another example of the upper rubber R2.

As shown in the figure, the upper rubber R2 does not need to include the small-diameter portion. The pair of seal portions R22 of the upper rubber R2 may be separated from each other as long as they are in contact with the upper portion 21B of the valve rod 21 in the through hole Ro.

Figure 33:
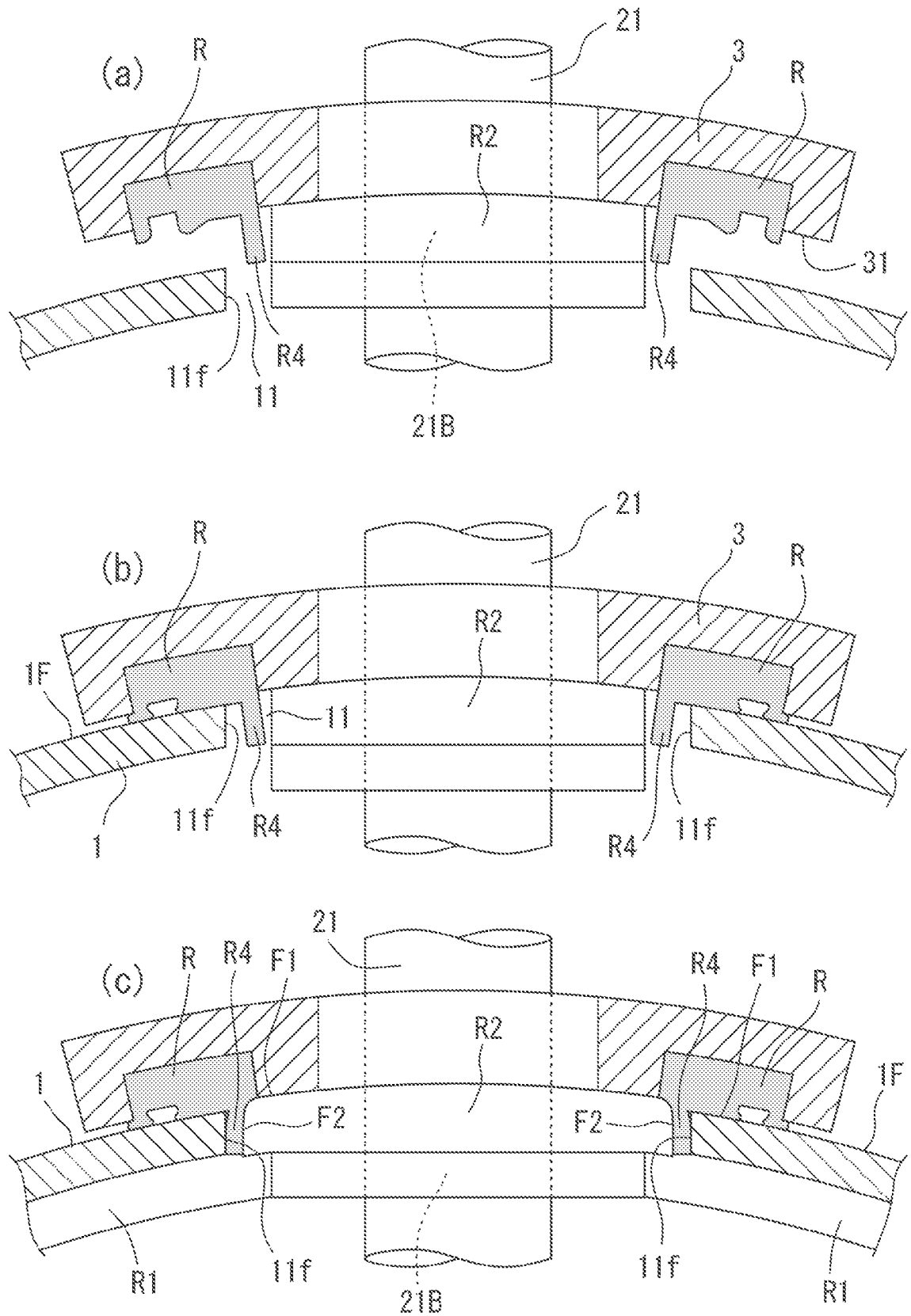
FIG. 33 is a schematic perspective view showing still another example of the upper rubber and the lid rubber, i.e., another example of the seal structure of the upper portion.

FIGS. 33(a) to 33(c) show still another example of the lid rubber R and the upper rubber R2.

As shown in the figure, the auxiliary seal portion R4 may protrude into the first opening 11 along the end face 11f of the first opening 11. In the case of this example, the upper rubber R2 is in contact with the end face 11f with the auxiliary seal portion R4 interposed therebetween as shown in FIG. 33(c).

Next, the difference between the process of the embodiment of FIG. 26A to FIG. 31 and the process of Embodiment 1 described above will be described.

Figure 26A:
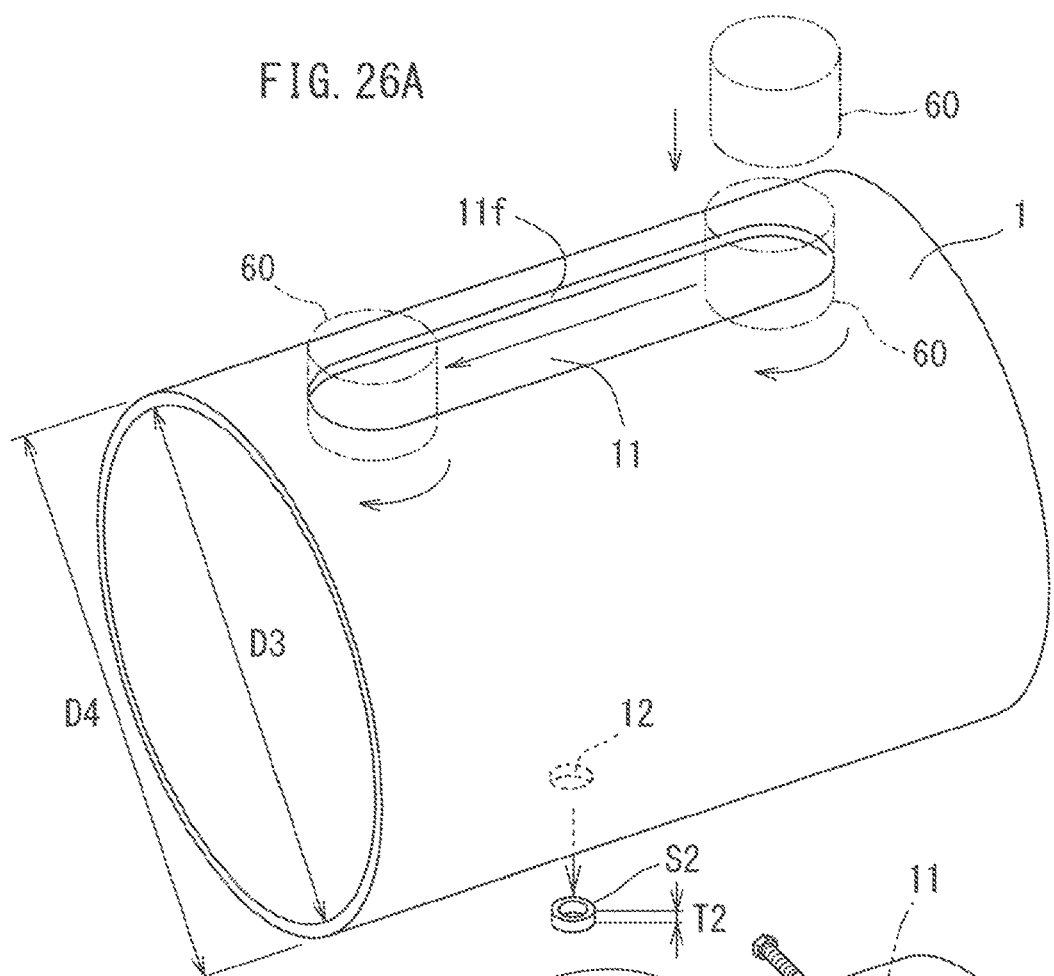
FIG. 26A and FIG. 26B are schematic perspective views each showing the structure of the butterfly valve according to Embodiment 4 and a part of the method for installing the same.
Figure 26B:
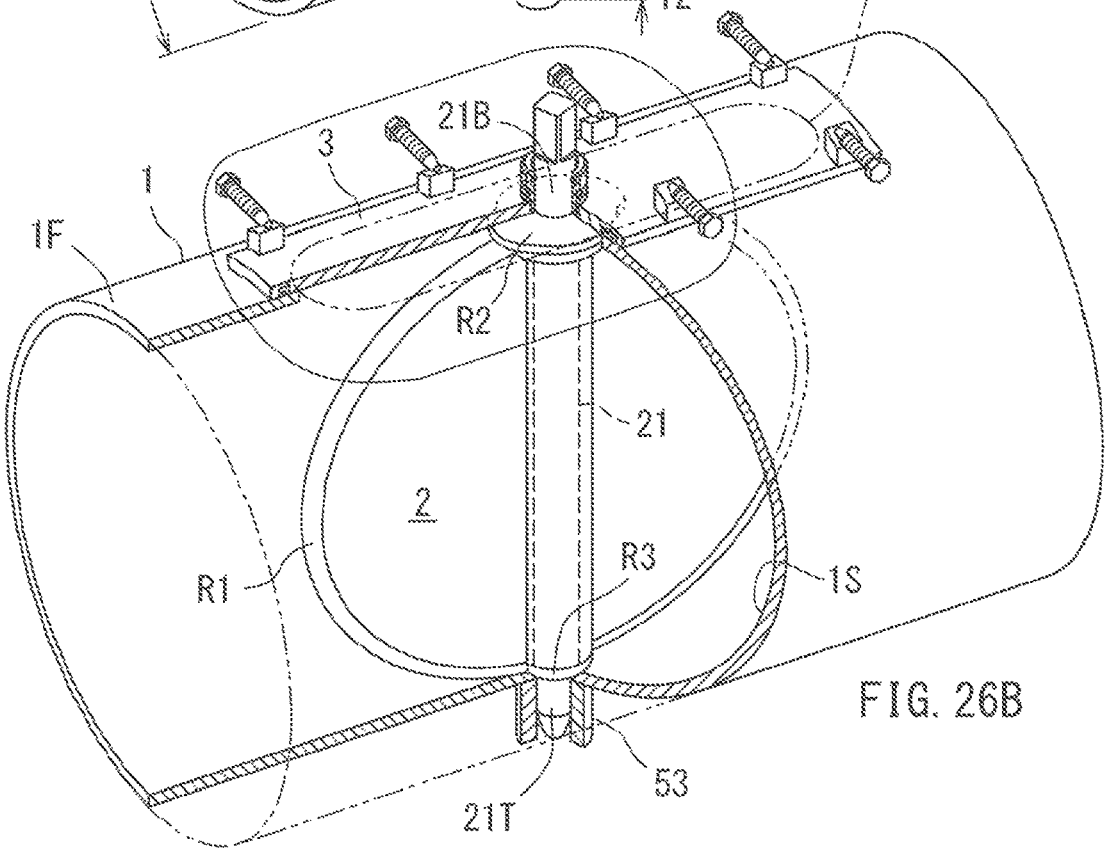

As shown in FIG. 26A and FIG. 26B, with the present embodiment, the first opening 11 is formed by the cutting tool 60, and the circular opening of FIG. 1A is not formed. Therefore, the butterfly valve 2 is inserted into the existing pipe 1 through the first opening 11, which generally has a uniform width.

That is, while the first opening 11 of FIG. 2 has the circular opening 10, the first opening 11 may simply be a band-shaped opening as shown in FIG. 26A. In this case, the first opening 11 can be formed using only the end mill of FIG. 26A.

In this case, the first cut piece S1 of FIG. 1A is not produced. Therefore, the inner diameter D3 of the existing pipe 1 may be calculated as follows.

First, the outer diameter D4 of the existing pipe 1 is measured. On the other hand, the thickness T2 of the cut piece S2 is measured. The inner diameter D3 of the existing pipe 1 is calculated by subtracting, from the measured outer diameter D4, a value that is obtained by multiplying the thickness T2 of the cut piece 82 by two.

The structure and the process of the embodiment of FIG. 23A to FIG. 31 are otherwise similar to those of the embodiment of FIG. 1 to FIG. 22, and will not be further described below.

Note that where the existing pipe 1 is a steel pipe, there may be burrs on the end face 11f. In this case, the burrs may be removed using another cutting tool other than the cutting tool 60.

The outer circumferential rubber R1 may be a tube that can be pressurized by a fluid pressure so as to accommodate variations in the inner diameter D3 of the existing pipe 1 of FIG. 1A or to be able to block the water through an existing pipe 1 that has a similar inner diameter D3.

While preferred embodiments have been described above with reference to the drawings, various obvious changes and modifications will readily occur to those skilled in the art upon reading the present specification.

Although the sealed case that encloses the existing pipe is divided in two parts, i.e., the first and second divided cases, in the embodiments described above, it may be divided into three or more parts.

The slider may be supported on a roller so that the slider can move in the pipe axis direction.

The case for enclosing the existing pipe and the valve element may be a cast product or may be formed from a steel plate. When formed from a steel plate, the first and second divided cases may be formed integral together.

Thus, such changes and modifications are deemed to fall within the scope of the present invention, which is defined by the appended claims.

INDUSTRIAL APPLICABILITY

The butterfly valve and the flow-undisrupted process of the present invention can be used for inserting a butterfly valve into a line of an existing pipe of water supply, oil, or the like, so as to stop the flow of the fluid by the inserted butterfly valve.

REFERENCE SIGNS LIST

1: Existing pipe, 1F: Outer circumferential surface, 1S: Inner circumferential surface
10: Circular opening, 11: First opening, 12: Second opening, 11f: End face
2: Butterfly valve, 21: Valve rod, 22: Valve element, 22b: Valve main body, 29: Base
21B: Upper portion, 21T: Lower end portion
3: Inner lid, 31: Inner surface, 301, 302: Engagement projection
4: Press tool, 4b: (First) pressing bolt, 4c: (Second) pressing bolt
5: Sealed case, 5a: First divided case, 5b: Second divided case, 50: Bearing portion
51: First protruding pipe portion, 52: Second protruding pipe portion, 53: Collar, 54: Rubber gasket
55: Outer lid, 56: Gate valve, 57: Lid plate
60: Cutting tool, 61: First hole saw, 62: Second hole saw (boring tool)
7: Slider, 70: Mover, 71: First surface, 72: Second surface
8: Operation case, 80: Airtight chamber, 81: First boring machine, 82: Second boring machine, 83: Boring machine
9: Decelerator, 90: Corrector, 92: Operation tank
D: Radial direction, Dx: Direction, Df: Downstream side, Sf: Upstream side
D1: First diameter, D2: Second diameter, D3: Inner diameter, D4: Outer diameter, D10: Diameter
G1, G2: Self-seal groove, G3, G4: Relief groove, F1: Top surface, F2: Tip end face
R: Lid rubber, R1: Outer circumferential rubber, R11, R12: Half-ring rubber, R2: Upper rubber R3: Rubber ring, R4: Auxiliary seal portion
R21: Small-diameter portion, R22: Large-diameter portion (seal portion), S: Pipe axis direction
S1: First cut piece, S2: Second cut piece
T1, T2: Thickness, V: Operation valve, W11: Width of first opening

The invention claimed is:

1. A piping structure having a butterfly valve installed in an existing pipe, the piping structure comprising:
an existing pipe that has a first opening of a groove shape elongated in a pipe axis direction;
an inner lid that shuts the first opening;
a valve rod extending in a radial direction of the existing pipe and an up-down direction, and running through the first opening; and
a butterfly-shaped valve element that is capable of rotating together with the valve rod and is accommodated in the existing pipe, the valve element including:
a circular plate-shaped valve body;
an outer circumferential rubber arranged along an outer circumference of the valve body; and
an upper rubber that is arranged around an upper portion of the valve rod and arranged in a portion of the first opening, and rotates together with the valve rod,
wherein the upper rubber includes a pair of seal portions, wherein in a valve-open state where the valve element is open, the pair of seal portions is in a non-sealed state where the pair of seal portions is spaced apart from a pair of end faces that defines the first opening and is elongated in the pipe axis direction so as not to seal between the pair of end faces and the pair of seal portions,
whereas in a valve-closed state where the valve element is closed, the pair of seal portions is in a sealed state so as to seal between an inner surface of the inner lid and the pair of seal portions and seal between the pair of end faces and the pair of seal portions.

2. The piping structure according to claim 1, wherein:
the pair of seal portions is formed by large-diameter portions that each protrude along a direction in which the outer circumferential rubber extends; and
each of the large-diameter portions has a top surface that is in contact with the inner surface of the inner lid in the valve-closed state and a tip end face that is in contact with a corresponding end face of the pair of end faces in the valve-closed state.

3. The piping structure according to claim 2, wherein the upper rubber is formed in a loop shape and a disc shape that define a through hole, the valve rod runs through the through hole.

4. The piping structure according to claim 3, wherein the upper rubber includes two of the large-diameter portions and two small-diameter portions, which have a diameter smaller than a diameter of the two large-diameter portions, continuously alternating with each other along a circumferential direction of the upper rubber.

5. The piping structure according to claim 4, wherein a loop-shaped lid rubber that seals between the inner lid and an outer circumferential surface of the existing pipe is secured on the inner surface of the inner lid.

6. The piping structure according to claim 5, wherein the lid rubber includes an auxiliary seal portion that is in contact with one of the pair of seal portions in the valve-closed state.

7. The piping structure according to claim 6, wherein:
in the valve-closed state, a space inside the existing pipe is divided by the valve element into an upstream side where a fluid pressure acts in the existing pipe and a downstream side where a fluid pressure in the existing pipe is depressurized; and
a self-seal groove is formed on the upstream side of the outer circumferential rubber, wherein in the valve-closed state, the self-seal groove receives the fluid pressure to press an outer circumference end portion of the outer circumferential rubber against an inner circumferential surface of the existing pipe.

8. The piping structure according to claim 7, wherein:
the outer circumferential rubber comprises a first half-ring rubber and a second half-ring rubber;
the first half-ring rubber is attached to an area of the valve element that rotates from the upstream side toward the downstream side when the valve element is closed;
the second half-ring rubber is attached to an area of the valve element that rotates from the downstream side toward the upstream side when the valve element is closed; and the outer circumference end portion of the first half-ring rubber has a higher rigidity than the outer circumference end portion of the second half-ring rubber.

9. The piping structure according to claim 5, comprising a press tool that presses the inner surface of the inner lid against the outer circumferential surface of the existing pipe, thereby compressing the lid rubber between the outer circumferential surface of the existing pipe and the inner surface of the inner lid.

10. The piping structure according to claim 1, wherein:
the existing pipe defines a circular second opening at a position that opposes the first opening;
the valve rod has a lower end portion that runs through the second opening with a portion of the lower end portion further protruding from the existing pipe.

11. The piping structure according to claim 10, further comprising a rubber ring that is attached to the lower end portion of the valve rod and seals between the lower end portion of the valve rod and an inner circumferential surface of the existing pipe.

12. The piping structure according to claim 11, comprising a press tool that presses the inner lid against the outer circumferential surface of the existing pipe, thereby:
   a. pressing the upper rubber against the inner surface of the inner lid; and
   b. pressing the rubber ring against the inner circumferential surface of the existing pipe.

13. The piping structure according to claim 12, further comprising a sealed case that covers areas of the existing pipe where the first and second openings are formed, the upper portion and the lower end portion of the valve rod, and the inner lid,
   wherein the sealed case includes a first protruding pipe portion that surrounds the inner lid from four directions, and an outer lid that is connected to the first protruding pipe portion to cover the inner lid.

14. The piping structure according to claim 13, wherein the press tool includes:
   a plurality of first pressing bolts that is supported on a pipe wall of the first protruding pipe portion and is moved forward and backward along a tangential direction to the existing pipe so as to press the inner lid against the outer circumferential surface of the existing pipe; and
   a plurality of second pressing bolts that is supported on the outer lid and is moved forward and backward along the radial direction of the existing pipe so as to press the inner lid against the outer circumferential surface of the existing pipe.

15. A process of installing a butterfly valve into an existing pipe, the process comprising:
   an assembly step of assembling a sealed case onto the existing pipe for airtightly enclosing a portion of the existing pipe;
   a cutting step of using a cutting tool that has been brought into the sealed case to form, in the existing pipe, a first opening of a groove shape elongated in a pipe axis direction of the existing pipe;
   a boring step of using a boring tool that has been brought into the sealed case to bore a circular second opening at a position that opposes the first opening of the existing pipe;
   an insertion step of inserting, in a valve-open state, a butterfly-shaped valve element that is integral with a valve rod, which runs through the first and second openings, into the existing pipe through the first opening until a lower end portion of the valve rod protrudes from the second opening; and
   a collar attachment step of attaching a collar to an outer circumference of the lower end portion of the valve rod that has been brought into a bearing portion of the sealed case in the insertion step, and
   further comprising a sealing step of pressing an inner lid that shuts the first opening, thereby compressing a loop-shaped lid rubber that seals between the inner lid and the existing pipe,
   wherein the sealing step is performed after the collar attachment step.

\* \* \* \* \*